US008919750B2

(12) United States Patent
Pearce et al.

(10) Patent No.: US 8,919,750 B2
(45) Date of Patent: Dec. 30, 2014

(54) CUSHIONING ELEMENTS COMPRISING BUCKLING WALLS AND METHODS OF FORMING SUCH CUSHIONING ELEMENTS

(75) Inventors: Tony M. Pearce, Alpine, UT (US); Russell B. Whatcott, Eagle Mountain, UT (US)

(73) Assignee: Edizone, LLC, Alpine, UT (US)

( * ) Notice: Subject to any disclaimer, the term of this patent is extended or adjusted under 35 U.S.C. 154(b) by 51 days.

(21) Appl. No.: 13/566,763

(22) Filed: Aug. 3, 2012

(65) Prior Publication Data
US 2013/0043628 A1 Feb. 21, 2013

Related U.S. Application Data

(60) Provisional application No. 61/575,202, filed on Aug. 16, 2011.

(51) Int. Cl.
| | |
|---|---|
| *F16F 3/087* | (2006.01) |
| *B23P 11/00* | (2006.01) |
| *A47C 7/02* | (2006.01) |
| *F16F 1/373* | (2006.01) |

(52) U.S. Cl.
CPC .. *A47C 7/02* (2013.01); *F16F 1/373* (2013.01)
USPC .......................................... 267/153; 267/80

(58) Field of Classification Search
CPC ........... F16F 1/371; F16F 1/377; F16F 1/422; F16F 1/3732; F16F 2236/02; F16F 1/445; F16F 1/54; F16F 15/02; F16F 15/067; F16F 15/08; F16F 7/00; F16F 7/14; A47C 27/085; A47C 7/021; A47C 4/54; A47C 27/081; A47C 20/027; A47C 20/021; A47C 20/023; A47C 20/026; A61G 7/05738; A61G 7/065; A61G 7/05723; A61G 13/12; A61G 9/10; A61G 9/1027; A61G 2009/003; A61G 2009/008
USPC ............ 267/153, 80, 136, 292, 140.3; 5/644, 5/655.5, 654, 909, 653, 652.1, 724, 727, 5/729–730, 632; 297/452.27, 452.37, 297/452.35, 452.58, 654, DIG. 1, DIG. 2
See application file for complete search history.

(56) References Cited

U.S. PATENT DOCUMENTS

| | | | |
|---|---|---|---|
| 3,049,344 A * | 8/1962 | Hawkins | ........................ 267/153 |
| 4,369,284 A | 1/1983 | Chen et al. | |
| 5,994,450 A | 11/1999 | Pearce et al. | |
| 7,666,341 B2 | 2/2010 | Pearce | |
| 7,730,566 B2 | 6/2010 | Flick et al. | |

(Continued)

*Primary Examiner* — Anna Momper
*Assistant Examiner* — San Aung
(74) *Attorney, Agent, or Firm* — TraskBritt

(57) ABSTRACT

Cushioning elements having a top cushioning surface and a bottom base surface include an elastomeric cushion member and a stabilizing material. The elastomeric cushion member includes a first plurality of interconnected buckling walls having a first mean height and a second plurality of buckling walls having a second mean height. Each buckling wall of the second plurality intersects and connects to at least two buckling walls of the first plurality. A surface of the stabilizing material on a side thereof opposite the elastomeric cushion member defines the bottom base surface of the cushioning element. The first ends of the first plurality of interconnected buckling walls and the first ends of the second plurality of buckling walls define the top cushioning surface of the cushioning element. Methods of forming cushioning elements include securing a stabilizing material to ends of the first plurality of interconnected buckling walls.

24 Claims, 15 Drawing Sheets

(56) References Cited

U.S. PATENT DOCUMENTS

| | | |
|---|---|---|
| 7,823,233 B2 | 11/2010 | Flick et al. |
| 7,823,234 B2 | 11/2010 | Flick et al. |
| 7,827,636 B2 | 11/2010 | Flick et al. |
| 7,964,664 B2 | 6/2011 | Pearce |
| 8,424,137 B1 * | 4/2013 | Pearce et al. ............... 5/630 |
| 2002/0066984 A1 * | 6/2002 | Suzuki et al. ............ 267/140.3 |
| 2004/0226098 A1 | 11/2004 | Pearce |
| 2007/0061978 A1 | 3/2007 | Losio |
| 2007/0205649 A1 * | 9/2007 | Hanson et al. ........... 297/452.58 |
| 2008/0115286 A1 * | 5/2008 | Flick et al. ................ 5/655.5 |
| 2009/0276957 A1 | 11/2009 | Boitet-Ball |

* cited by examiner

CUSHIONING ELEMENTS COMPRISING BUCKLING WALLS AND METHODS OF FORMING SUCH CUSHIONING ELEMENTS

CROSS-REFERENCE TO RELATED APPLICATION

This application claims the benefit of U.S. Provisional Patent Application Ser. No. 61/575,202, filed Aug. 16, 2011, and entitled "Stabilized Inverted Multi-Walled Gel Cushion," the disclosure of which is incorporated herein by reference in its entirety.

FIELD

Embodiments of the disclosure relate generally to cushioning elements, to products including cushioning elements, and to methods of making and using cushioning elements.

BACKGROUND

Cushioning materials have a variety of uses, such as for mattresses, seating surfaces, shoe inserts, packaging, medical devices, etc. Cushioning materials may be formulated and/or configured to reduce peak pressure on a cushioned body, which may increase comfort for humans or animals, and may protect objects from damage. Cushioning materials may be formed of materials that deflect or deform under load, such as polyethylene or polyurethane foams (e.g., convoluted foam), vinyl, rubber, springs, natural or synthetic fibers, fluid-filled flexible containers, etc. Different cushioning materials may have different responses to a given pressure, and some materials may be well suited to different applications. Cushioning materials may be used in combination with one another to achieve selected properties.

U.S. Pat. No. 7,730,566, issued Jun. 8, 2010, and entitled Multi-Walled Gelastic Material, the disclosure of which is incorporated herein in its entirety by this reference, describes cushion structures having interconnected walls that buckle. A first wall buckles when a threshold force is applied. Buckling of the first wall may cause buckling of a second wall, which may decrease the chance that the first wall will "bottom out." Bottoming out would increase pressure on the portion of the cushioned object over the buckled portion of the cushion. One side of the cushion has walls spaced relatively close together, and the opposite side has walls spaced farther apart. That is, some walls of the cushion extend only partially through the cushion. The wider-spaced portions of the walls may buckle more easily than the closer-spaced portions of the walls when an irregularly shaped object presses against the walls.

BRIEF SUMMARY

In some embodiments, a cushioning element having a top cushioning surface and a bottom base surface includes an elastomeric cushion member and a stabilizing material. The elastomeric cushion member includes a first plurality of interconnected buckling walls having a first mean height and comprising an elastomeric material and a second plurality of buckling walls having a second mean height less than the first mean height, the second plurality of buckling walls comprising the elastomeric material. Each interconnected buckling wall of the first plurality has a first end in a first plane and a second end in a second plane, the first mean height measured from the first end of the interconnected buckling walls to the second end of the interconnected buckling walls. Each buckling wall of the second plurality has a first end in the first plane and a second end between the first plane and the second plane, the second mean height measured from the first end of the buckling walls to the second end of the buckling walls. Each buckling wall of the second plurality intersects and connects to at least two buckling walls of the first plurality. The elastomeric material comprises an elastomeric polymer. The stabilizing material is secured to the second ends of the first plurality of interconnected buckling walls and may have a material composition differing from a material composition of the first plurality of interconnected buckling walls. A surface of the stabilizing material on a side thereof opposite the elastomeric cushion member defines the bottom base surface of the cushioning element, i.e., the side opposite the side where the cushioned object applies force to the cushioning member. The first ends of the first plurality of interconnected buckling walls and the first ends of the second plurality of buckling walls define the top cushioning surface of the cushioning element, i.e., the side where the cushioned object applies force to the cushioning member.

A method of forming a cushioning element having a top cushioning surface and a bottom base surface includes providing an elastomeric cushion member. The elastomeric cushion member includes a first plurality of interconnected buckling walls having a first mean height and comprising an elastomeric material, and a second plurality of buckling walls having a second mean height less than the first mean height, the second plurality of buckling walls comprising the elastomeric material, wherein the first ends of the first plurality of interconnected buckling walls and the first ends of the second plurality of buckling walls define the top cushioning surface of the cushioning element. The method further includes securing a stabilizing material to the second ends of the first plurality of interconnected buckling walls. Each interconnected buckling wall of the first plurality has a first end in a first plane and a second end in a second plane, the first mean height measured from the first end of the interconnected buckling walls to the second end of the interconnected buckling walls. Each buckling wall of the second plurality intersects and connects to at least two buckling walls of the first plurality. Each buckling wall of the second plurality has a first end in the first plane and a second end between the first plane and the second plane, the second mean height measured from the first end of the buckling walls to the second end of the buckling walls. The elastomeric material comprises an elastomeric polymer. The stabilizing material may have a material composition differing from a material composition of the first plurality of interconnected buckling walls, and a surface of the stabilizing material on a side thereof opposite the elastomeric cushion member defines the bottom base surface of the cushioning element.

BRIEF DESCRIPTION OF THE DRAWINGS

While the specification concludes with claims particularly pointing out and distinctly claiming what are regarded as embodiments of the present invention, various features and advantages may be more readily ascertained from the following description of example embodiments of the disclosure provided with reference to the accompanying drawings, in which:

DETAILED DESCRIPTION

As used herein, the term "cushioning element" means and includes any deformable device intended for use in cushioning one body relative to another. As a non-limiting example, cushioning elements (e.g., seat cushions) include materials intended for use in cushioning the body of a person relative to another object (e.g., a chair seat) that might otherwise abut against the body of the person.

As used herein, the term "elastomeric polymer" means and includes a polymer capable of recovering its original size and shape after deformation. In other words, an elastomeric polymer is a polymer having elastic or viscoelastic properties. Elastomeric polymers may also be referred to as "elastomers" in the art. Elastomeric polymers include, without limitation, homopolymers (polymers having a single chemical unit repeated) and copolymers (polymers having two or more chemical units).

As used herein, the term "elastomeric block copolymer" means and includes an elastomeric polymer having groups or blocks of homopolymers linked together, such as A-B diblock copolymers and A-B-A triblock copolymers. A-B diblock copolymers have two distinct blocks of homopolymers. A-B-A triblock copolymers have two blocks of a single homopolymer (A) each linked to a single block of a different homopolymer (B).

As used herein, the term "plasticizer" means and includes a substance added to another material (e.g., an elastomeric polymer) to increase a workability of the material. For example, a plasticizer may increase the flexibility, softness, or extensibility of the material. Plasticizers include, without limitation, hydrocarbon fluids, such as mineral oils. Hydrocarbon plasticizers may be aromatic or aliphatic.

As used herein, the term "elastomeric material" means and includes elastomeric polymers and mixtures of elastomeric polymers with plasticizers and/or other materials. Elastomeric materials are elastic (i.e., capable of recovering size and shape after deformation). Elastomeric materials include, without limitation, materials referred to in the art as "elastomer gels," "gelatinous elastomers," or simply "gels."

The illustrations presented herein are not actual views of any particular material or device, but are merely idealized representations employed to describe embodiments of the present disclosure. Elements common between figures may retain the same numerical designation.

The present disclosure describes cushioning elements including buckling walls and a stabilizing material. The buckling walls include walls of differing heights, such that one side of a cushioning element has buckling walls spaced closer together than the other side. The different-height buckling walls buckle under different loads.

Figure 1A:
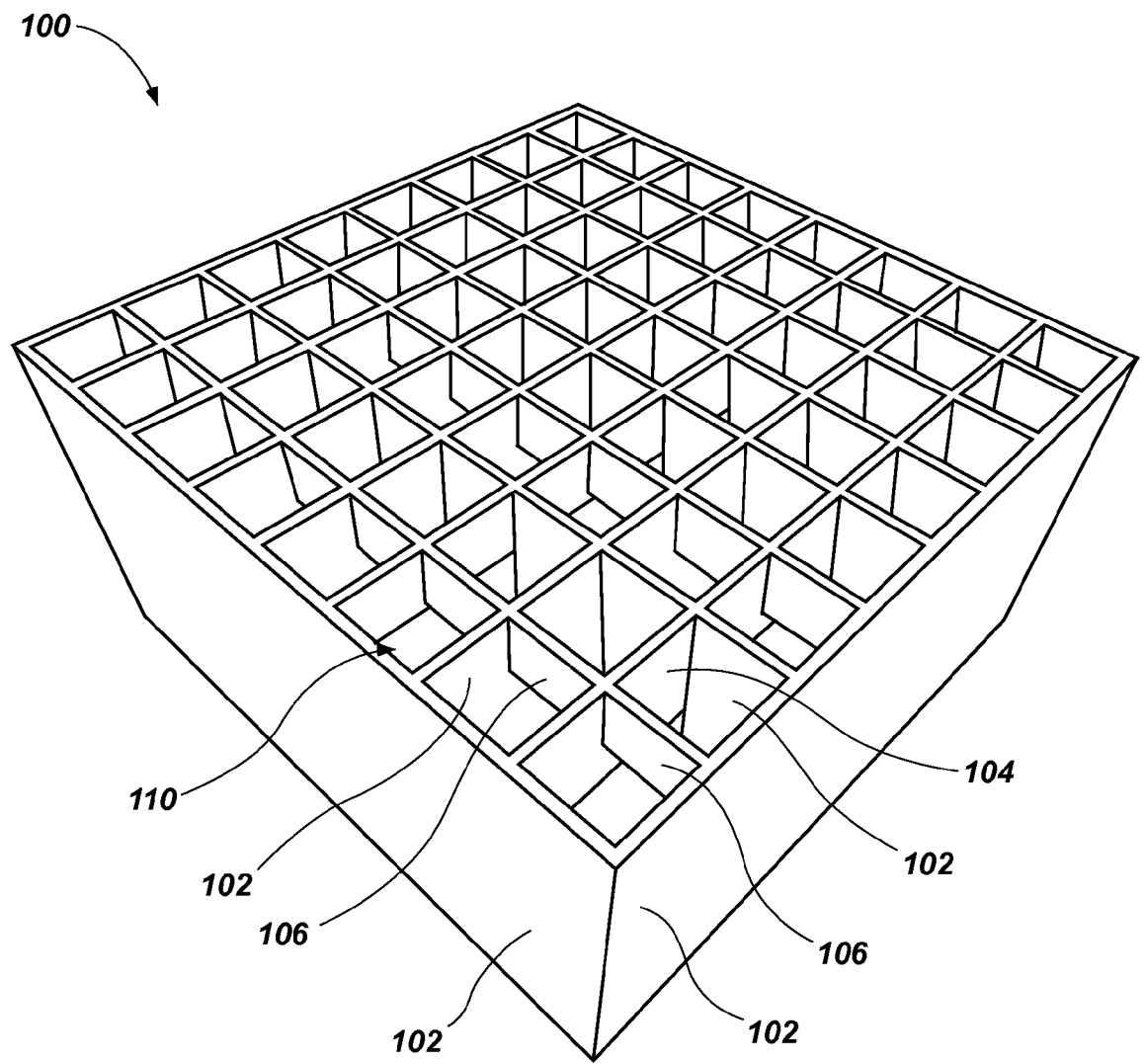
FIG. 1A is a top perspective view of an elastomeric cushion member having buckling walls.
Figure 1B:
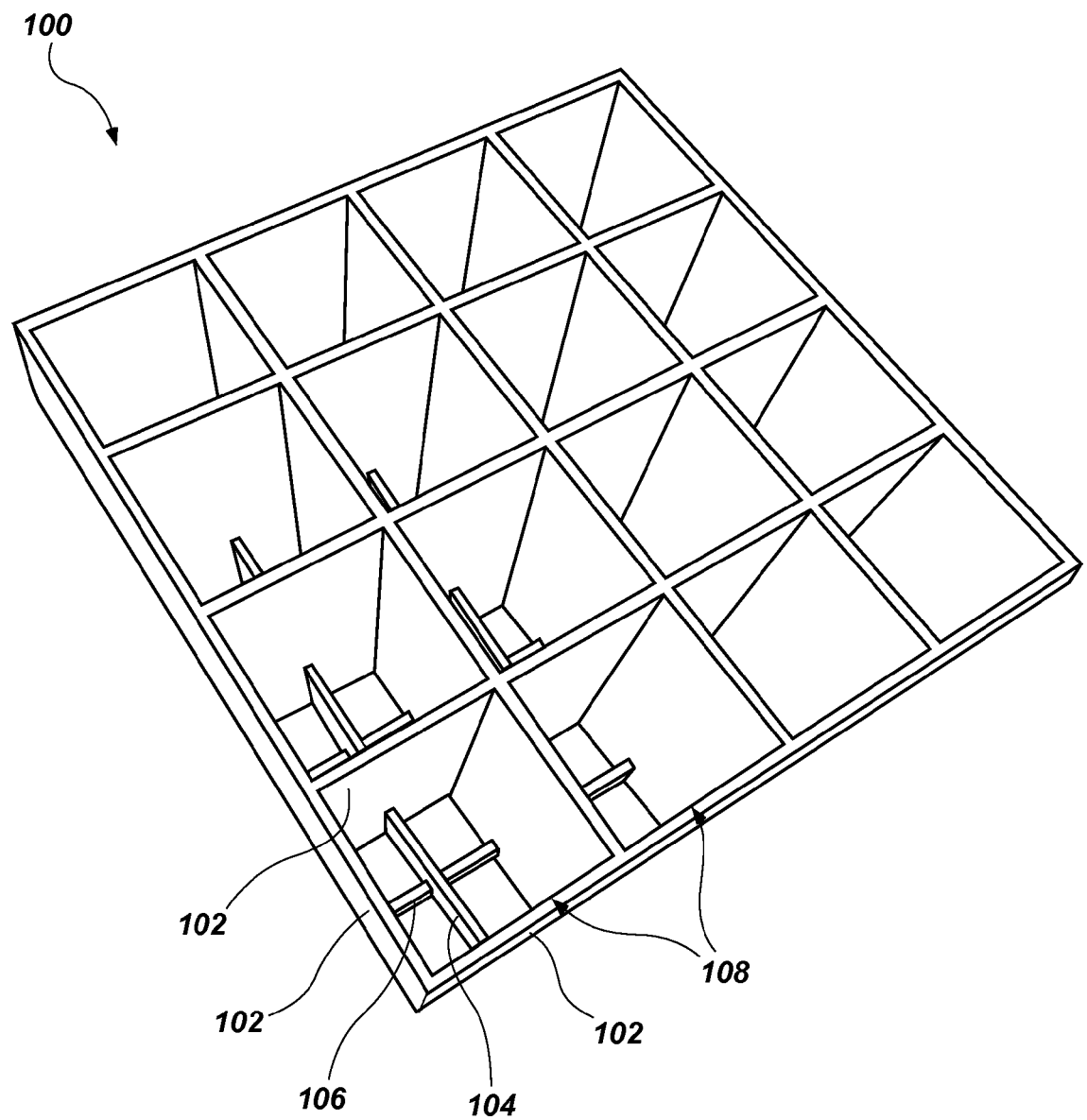
FIG. 1B is a bottom perspective view of the elastomeric cushion member of FIG. 1A.
Figure 1C:
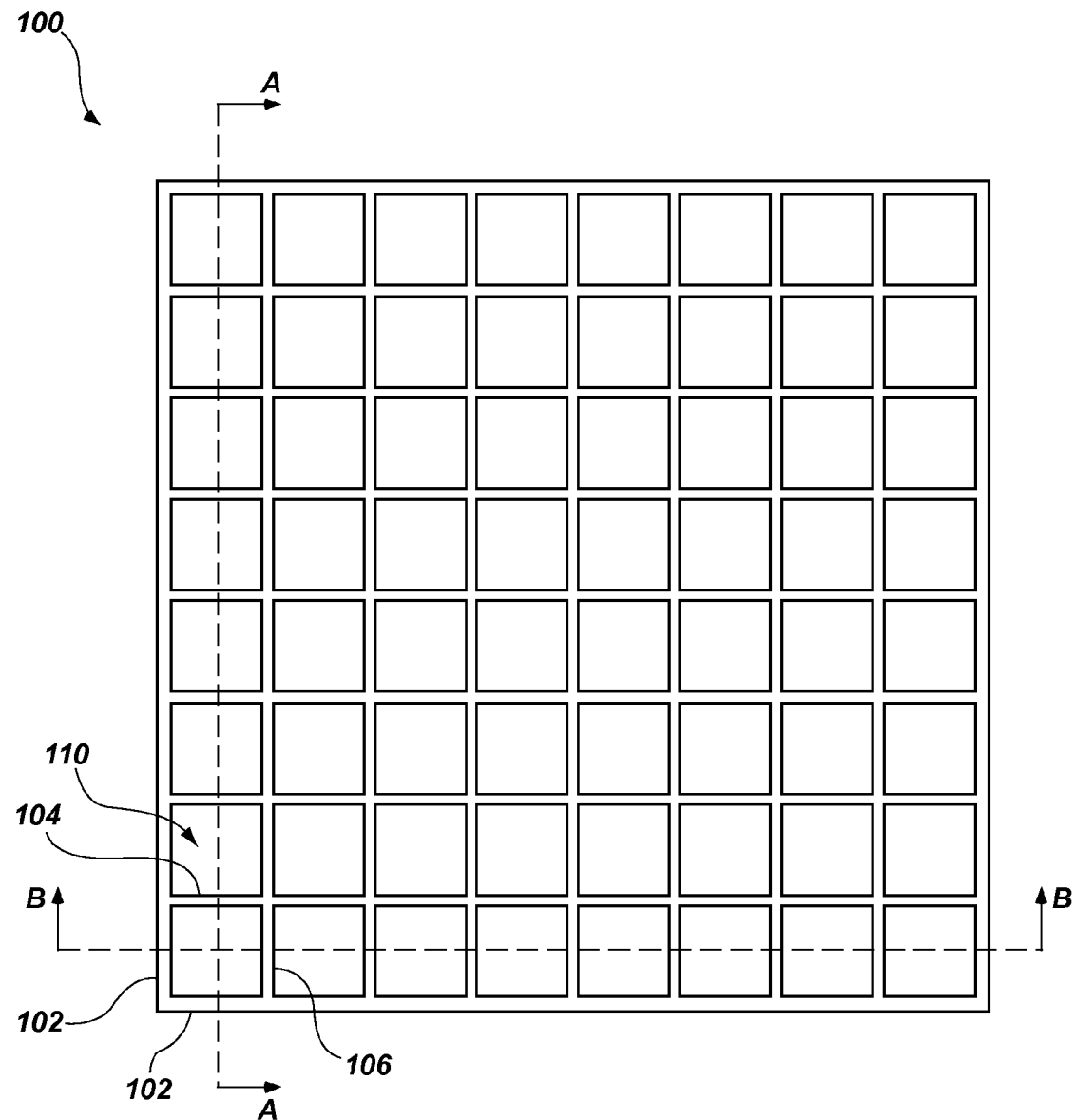
FIG. 1C is a top plan view of the elastomeric cushion member of FIGS. 1A and 1B.
Figure 1D:
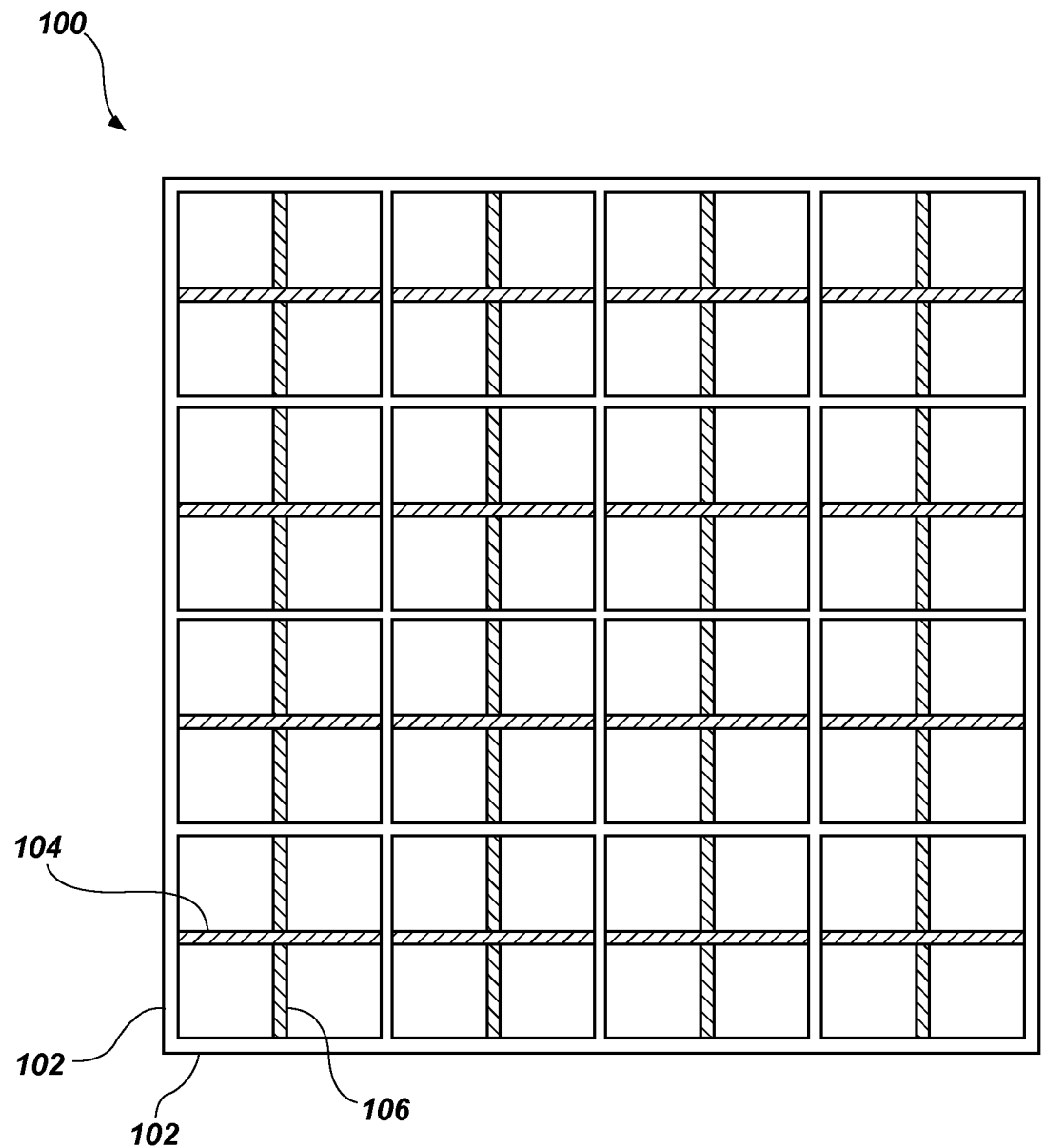
FIG. 1D is a bottom plan view of the elastomeric cushion member of FIGS. 1A-1C.
Figure 1E:
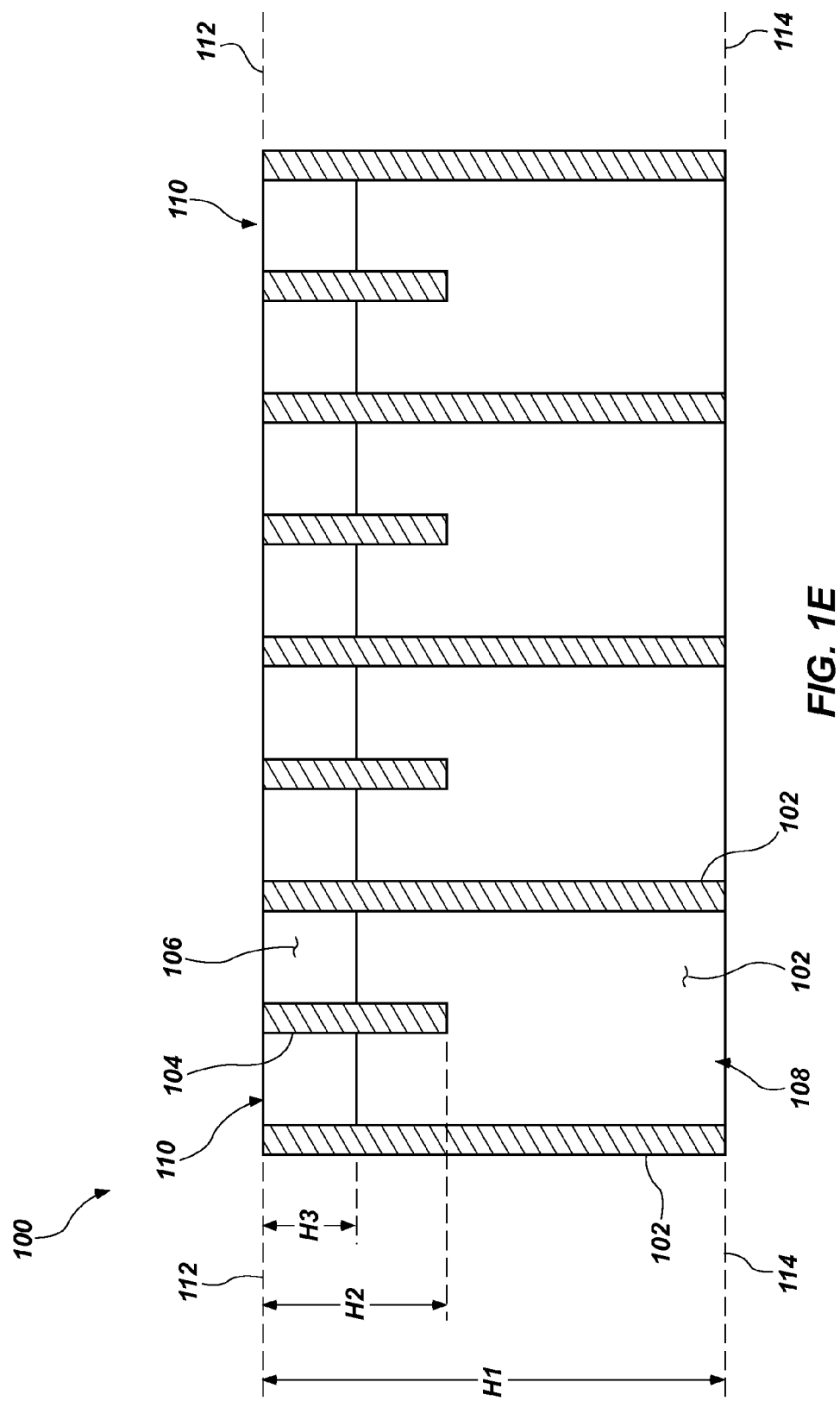
FIG. 1E is a cross-sectional side view of the elastomeric cushion member of FIGS. 1A-1D viewed in the plane of section line A-A in FIG. 1C.
Figure 1F:
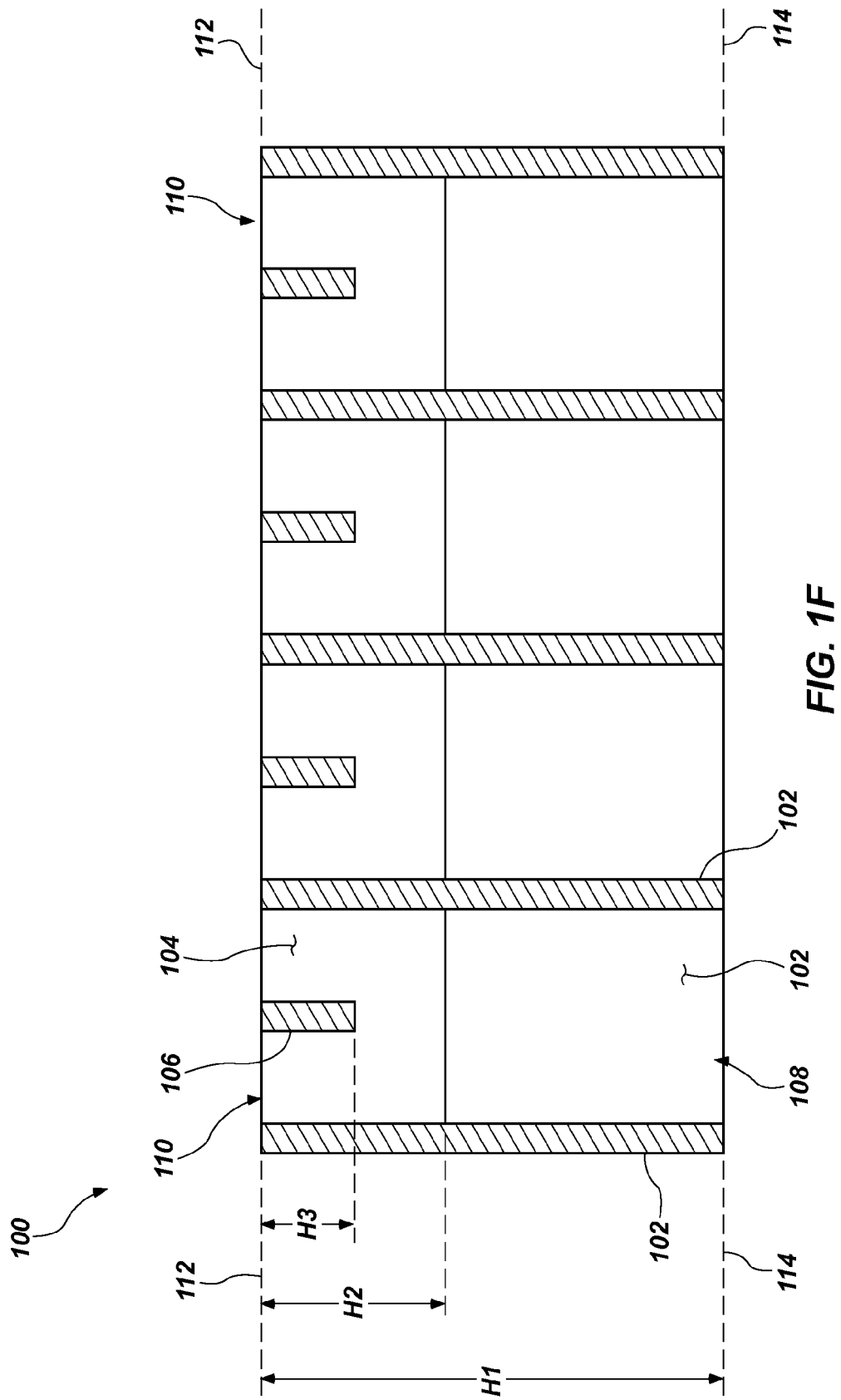
FIG. 1F is a cross-sectional side view of the elastomeric cushion member of FIGS. 1A-1E viewed in the plane of section line B-B in FIG. 1C.

FIG. 1A shows a top perspective view of a cushioning element 100 having buckling walls 102, 104, 106. FIG. 1B shows a bottom perspective view of the cushioning element 100. FIG. 1C shows a top plan view of the cushioning element 100. FIG. 1D shows a bottom plan view of the cushioning element 100. FIG. 1E shows a section view of the cushioning element 100 from the section line A-A shown in FIG. 1C. FIG. 1F shows a section view of the cushioning element 100 from the section line B-B shown in FIG. 1C. The buckling walls 102 are taller than the buckling walls 104, which are in turn taller than the buckling walls 106. Because the buckling walls 102, 104, 106 have different heights, they buckle under different loads, as explained in more detail below.

The buckling walls 102 of cushioning element 100 are interconnected to one another. FIGS. 1A through 1D show buckling walls 102 oriented in two directions, intersecting at right angles, and defining square voids 108 (see FIG. 1B). However, the buckling walls 102 may intersect one another at any angle. For example, the buckling walls 102 may intersect at other angles and define voids 108 of other shapes, such as triangles, parallelograms, hexagons, etc.

The buckling walls 102 of the cushioning element 100 each have a surface in a first plane 112 and another surface in a second plane 114 (see FIGS. 1E and 1F). That is, one end of each buckling wall 102 is in the first plane 112 and the opposite end of each buckling wall 102 is in the second plane 114. The buckling walls 102 have a height H1 equal to the distance between the first plane 112 and the second plane 114.

The buckling walls 104 are shorter than the buckling walls 102. The buckling walls 104 may have a height H2 from about 10% to about 90% of the height H1 of the buckling walls 102. The buckling walls 104 of the cushioning element 100 each have a surface in the first plane 112 and another surface between the first plane 112 and the second plane 114 (see FIGS. 1E and 1F). That is, one end of each buckling wall 104 is in the first plane 112 and the opposite end of each buckling wall 104 is between the first plane 112 and the second plane 114.

The cushioning element 100 may include buckling walls 106 that are shorter than the buckling walls 104. The buckling walls 106 may have a height H3 from about 5% to about 80% of the height H1 of the buckling walls 102. The buckling walls 106 of the cushioning element 100 each have a surface in the first plane 112 and another surface between the first plane 112 and the second plane 114 (see FIGS. 1E and 1F). That is, one end of each buckling wall 106 is in the first plane 112 and the opposite end of each buckling wall 106 is between the first plane 112 and the second plane 114. The buckling walls 102, 104, 106 may together define voids 110 (see FIG. 1A) smaller than the voids 108 (see FIG. 1B). In the cushioning element 100 shown in FIGS. 1A through 1F, each void 108 corresponds to four voids 110. The buckling walls 102, 104, 106 may vary in thickness between their ends. For example, the portion of the buckling walls 102 adjacent to buckling walls 104 may be thinner than the portion below buckling walls 104. The transition in thickness may be stepped or gradual.

The ends of the buckling walls 104, 106 between the first plane 112 and the second plane 114 may be flat, as shown in FIGS. 1E and 1F. Alternatively, the ends of the buckling walls 104, 106 between the first plane 112 and the second plane 114 may curved (concave, convex, or both), as described in U.S. Pat. No. 7,730,566, previously incorporated by reference, or otherwise non-planar (e.g., having a step pattern). The shape of the ends of the buckling walls 104, 106 between the first plane 112 and the second plane 114 may affect the strength of the buckling walls 104, 106 and the properties of the cushioning element 100 overall.

The buckling walls 102, 104, 106 are formed of an elastomeric material. Elastomeric materials are described in, for example, U.S. Pat. No. 5,994,450, issued Nov. 30, 1999, and entitled "Gelatinous Elastomer and Methods of Making and Using the Same and Articles Made Therefrom"; U.S. Pat. No. 7,964,664, issued Jun. 21, 2011, and entitled "Gel with Wide Distribution of MW in Mid-Block"; and U.S. Pat. No. 4,369,284, issued Jan. 18, 1983, and entitled "Thermoplastic Elastomer Gelatinous Compositions"; the disclosures of each of which are incorporated herein in their entirety by this reference. The elastomeric material may include an elastomeric polymer and a plasticizer. The elastomeric material may be a gelatinous elastomer (also referred to in the art as gel, elastomer gel, or elastomeric gel), a thermoplastic elastomer, a natural rubber, a synthetic elastomer, a blend of natural and synthetic elastomers, etc.

The elastomeric polymer may be an A-B-A triblock copolymer such as styrene ethylene propylene styrene (SEPS), styrene ethylene butylene styrene (SEBS), and styrene ethylene ethylene propylene styrene (SEEPS). For example, A-B-A triblock copolymers are currently commercially available from Kuraray America, Inc., of Houston, Tex., under the trade name SEPTON® 4055, and from Kraton Polymers, LLC, of Houston, Tex., under the trade names KRATON® E1830, KRATON® G1650, and KRATON® G1651. In these examples, the "A" blocks are styrene. The "B" block may be rubber (e.g., butadiene, isoprene, etc.) or hydrogenated rubber (e.g., ethylene/propylene or ethylene/butylene or ethylene/ethylene/propylene) capable of being plasticized with mineral oil or other hydrocarbon fluids. The elastomeric material may include elastomeric polymers other than styrene-based copolymers, such as non-styrenic elastomeric polymers that are thermoplastic in nature or that can be solvated by plasticizers or that are multi-component thermoset elastomers.

The elastomeric material may include one or more plasticizers, such as hydrocarbon fluids. For example, elastomeric materials may include aromatic-free food-grade white paraffinic mineral oils, such as those sold by Sonneborn, Inc., of Mahwah, N.J., under the trade names BLANDOL® and CARNATION®.

In some embodiments, the elastomeric material may have a plasticizer-to-polymer ratio from about 0.1:1 to about 50:1 by weight. For example, elastomeric materials may have plasticizer-to-polymer ratios from about 1:1 to about 30:1 by weight, or even from about 1.5:1 to about 10:1 by weight. In further embodiments, elastomeric materials may have plasticizer-to-polymer ratios of about 2:1 by weight.

The elastomeric material may have one or more fillers (e.g., lightweight microspheres). Fillers may affect thermal properties, density, processing, etc., of the elastomeric material. For example, hollow microspheres (e.g., hollow glass microspheres or hollow acrylic microspheres) may decrease the thermal conductivity of the elastomeric material by acting as an insulator because such hollow microspheres (e.g., hollow glass microspheres or hollow acrylic microspheres) may have lower thermal conductivity than the plasticizer or the polymer. As another example, metal particles (e.g., aluminum, copper, etc.) may increase the thermal conductivity of the resulting elastomeric material because such particles may have greater thermal conductivity than the plasticizer or polymer. Microspheres filled with wax or another phase-change material (i.e., a material formulated to undergo a phase change near a temperature at which a cushioning element may be used) may provide temperature stability at or near the phase-change temperature of the wax or other phase-change material within the microspheres (i.e., due to the heat of fusion of the phase change). The phase-change material may have a melting point from about 20° C. to about 45° C.

The elastomeric material may also include antioxidants. Antioxidants may reduce the effects of thermal degradation during processing or may improve long-term stability. Antioxidants include, for example, pentaerythritol tetrakis(3-(3,5-di-tert-butyl-4-hydroxyphenyl)propionate), commercially available as IRGANOX® 1010, from BASF Corp., of Iselin, N.J. or as EVERNOX®-10, from Everspring Chemical, of Taichung, Taiwan; octadecyl-3-(3,5-di-tert-butyl-4-hydroxyphenyl)propionate, commercially available as IRGANOX® 1076, from BASF Corp. or as EVERNOX® 76, from Everspring Chemical; and tris(2,4-di-tert-butylphenyl)phosphite, commercially available as IRGAFOS® 168, from BASF Corp. or as EVERFOS® 168, from Everspring Chemical. One or more antioxidants may be combined in a single formulation of elastomeric material. The use of antioxidants in mixtures of plasticizers and polymers is described in columns 25 and 26 of U.S. Pat. No. 5,994,450, previously incorporated by reference. The elastomeric material may include up to about 5 wt % antioxidants. For instance, the elastomeric material may include from about 0.10 wt % to about 1.0 wt % antioxidants.

In some embodiments, the elastomeric material may include a resin. The resin may be selected to modify the elastomeric material to slow a rebound of the cushioning element 100 after deformation. The resin, if present, may include a hydrogenated pure monomer hydrocarbon resin, such as those commercially available from Eastman Chemical Company, of Kingsport, Tenn., under the trade name REGALREZ®. The resin, if present, may function as a tackifier, increasing the stickiness of a surface of the elastomeric material.

In some embodiments, the elastomeric material may include a pigment or a combination of pigments. Pigments may be aesthetic and/or functional. That is, pigments may provide a cushioning element 100 with an appearance appealing to consumers. In addition, a cushioning element 100 having a dark color may absorb radiation differently than a cushioning element 100 having a light color.

The elastomeric material may include any type of gelatinous elastomer. For example, the elastomeric material may include a melt-blend of one part by weight of a styrene-ethylene-ethylene-propylene-styrene (SEEPS) elastomeric triblock copolymer (e.g., SEPTON® 4055) with two parts by weight of a 70-weight straight-cut white paraffinic mineral oil (e.g., CARNATION® white mineral oil) and, optionally, pigments, antioxidants, and/or other additives.

The elastomeric material may include a material that returns to its original shape after deformation, and that may be elastically stretched. The elastomeric material may be rubbery in feel, but may deform to the shape of an object applying a deforming pressure better than conventional rubber materials, and may have a durometer hardness lower than conventional rubber materials. For example, the elastomeric material may have a hardness on the Shore A scale of less than about 50, from about 0.1 to about 50, or less than about 5.

The elastomeric material may be generally nonsticky, such that the cushioning element 100 may return to its original shape after a load is removed. That is, the elastomeric material may be sufficiently nonsticky so that buckling walls 102, 104, 106 do not stick to one another or do not remain stuck to one another after a deforming force is removed. Thus, any contact between adjacent buckling walls 102, 104, 106 may cease immediately or soon after the force is removed. The elastomeric material may be formulated to have any selected stickiness or tackiness, such as to control the rate of response to removal of a load.

Figure 2A:
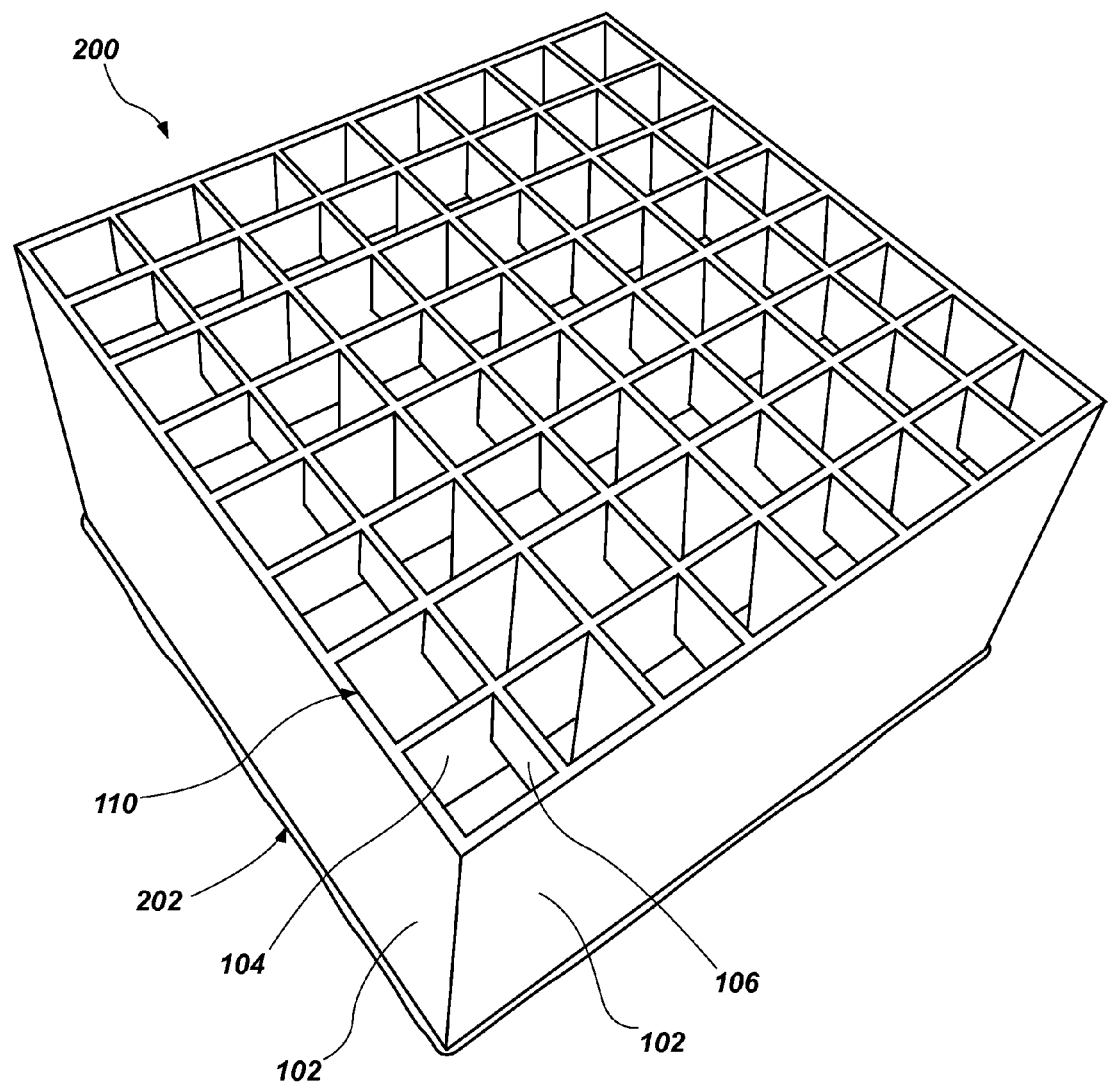
FIG. 2A is a top perspective view of a cushioning element that comprises the elastomeric cushion member of FIGS. 1A-1F and a stabilizing material attached to a bottom surface of the elastomeric cushion member.
Figure 2B:
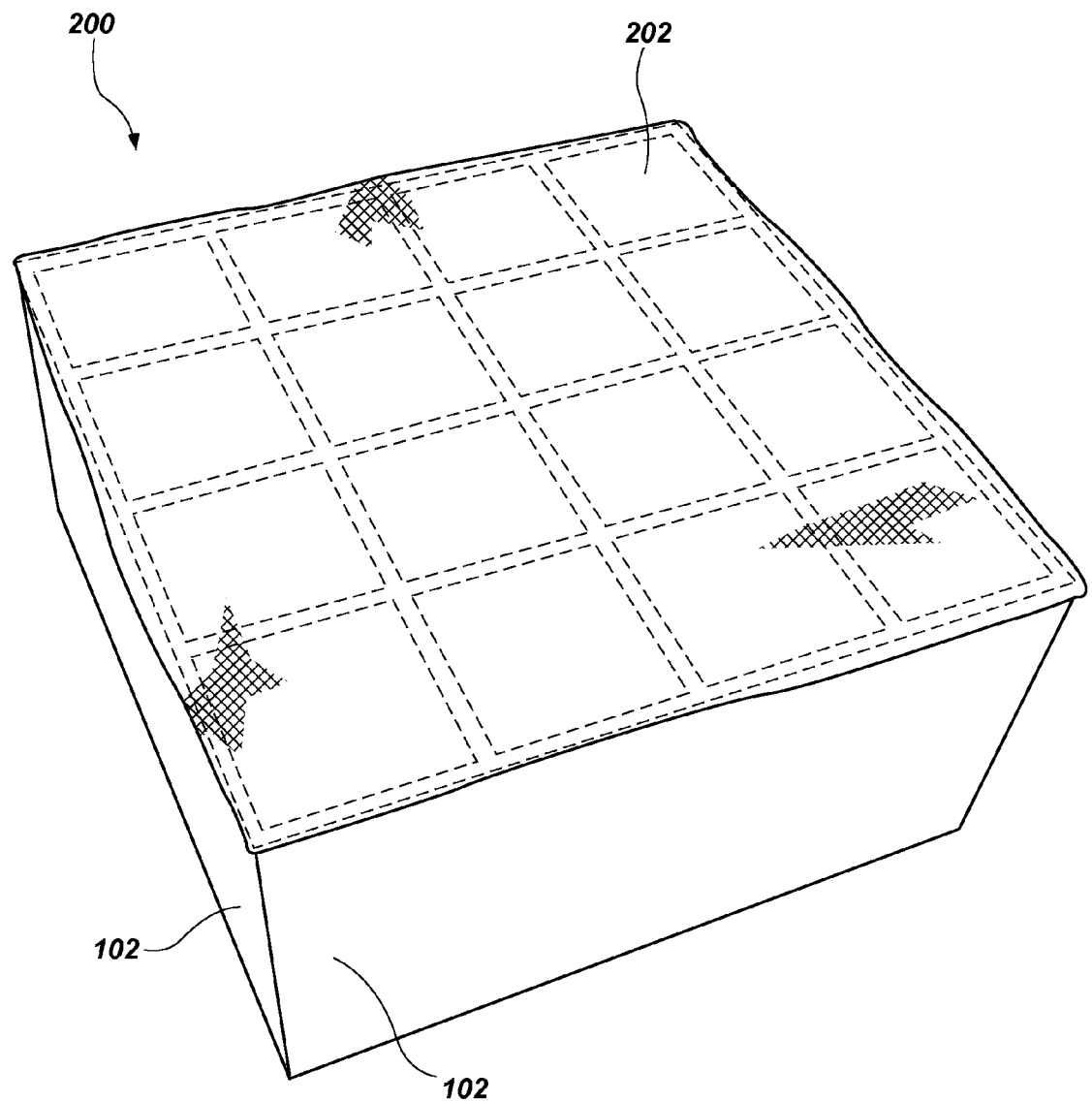
FIG. 2B is a bottom perspective view of the cushioning element of FIG. 2A.
Figure 2C:
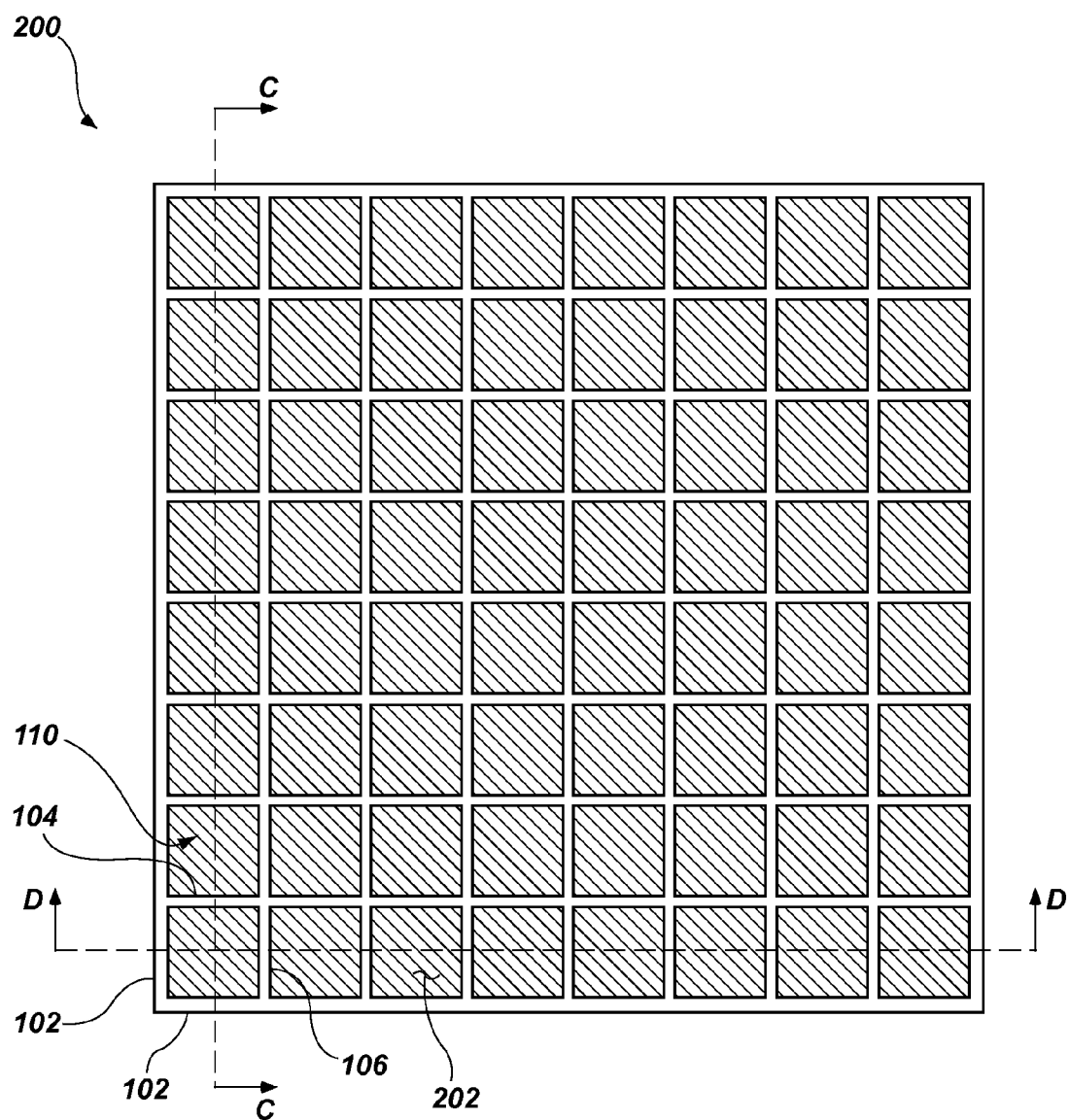
FIG. 2C is a top plan view of the cushioning element of FIGS. 2A and 2B.
Figure 2D:
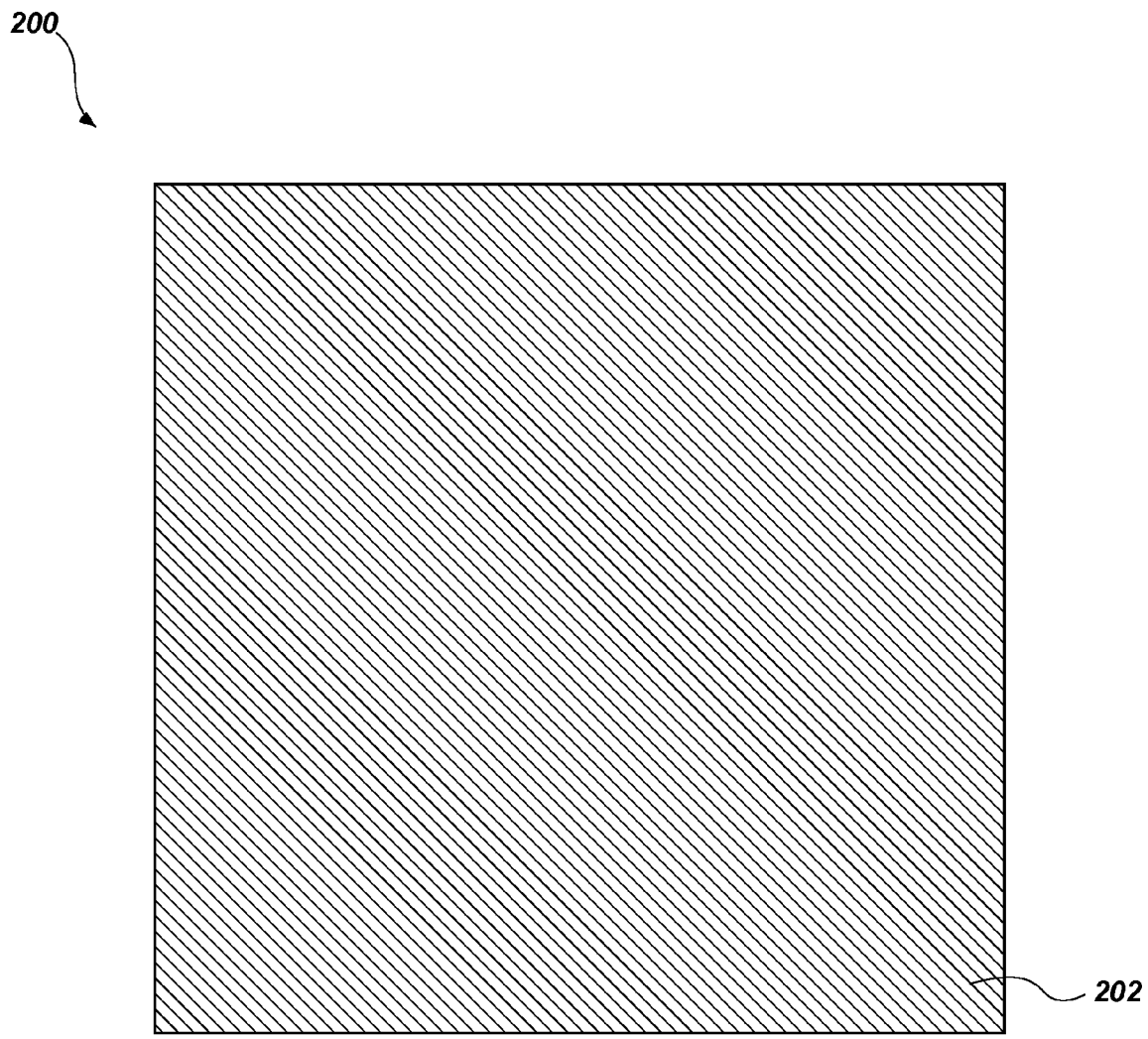
FIG. 2D is a bottom plan view of the cushioning element of FIGS. 2A-2C.
Figure 2E:
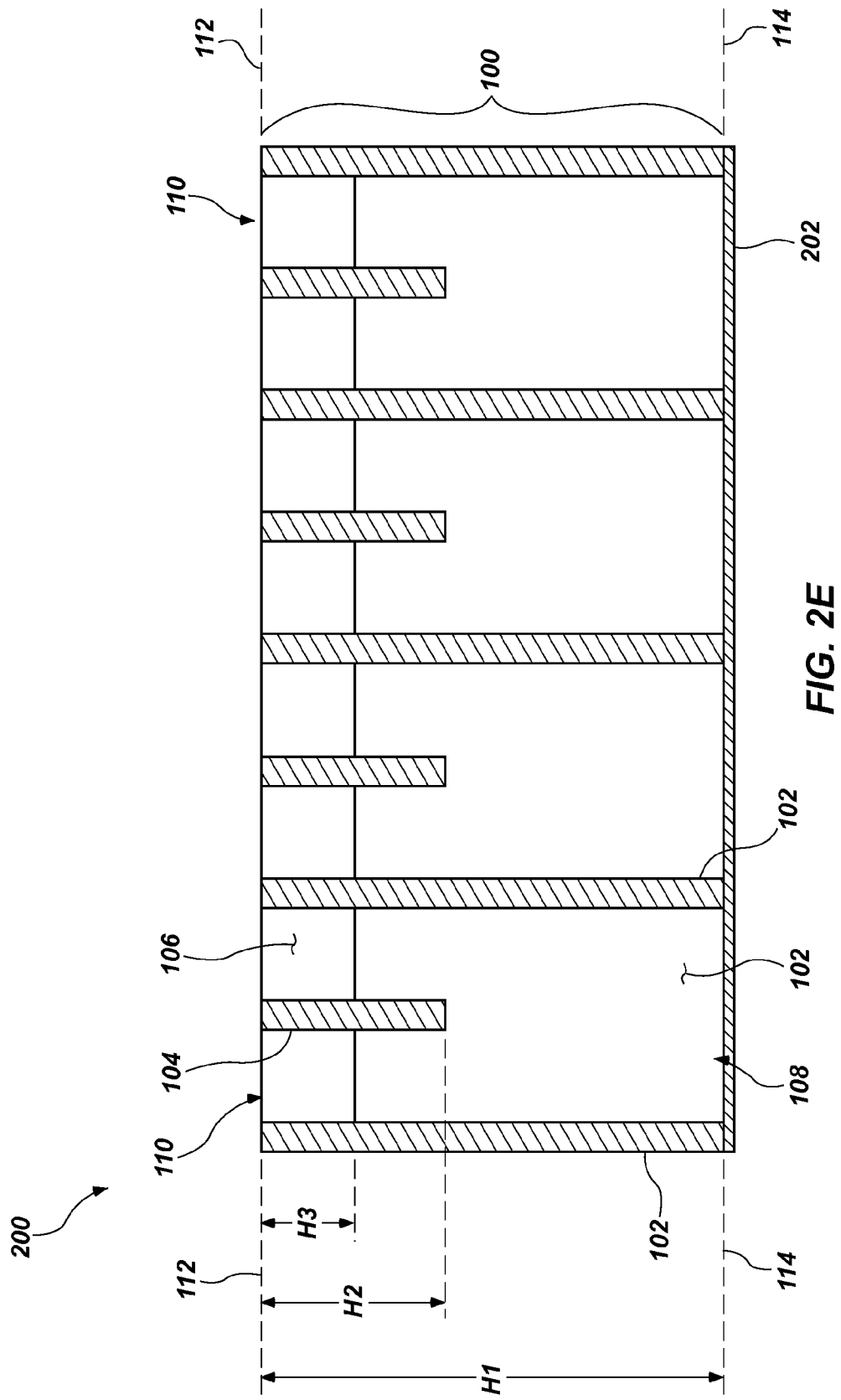
FIG. 2E is a cross-sectional side view of the cushioning element of FIGS. 2A-2D viewed in the plane of section line C-C in FIG. 2C.
Figure 2F:
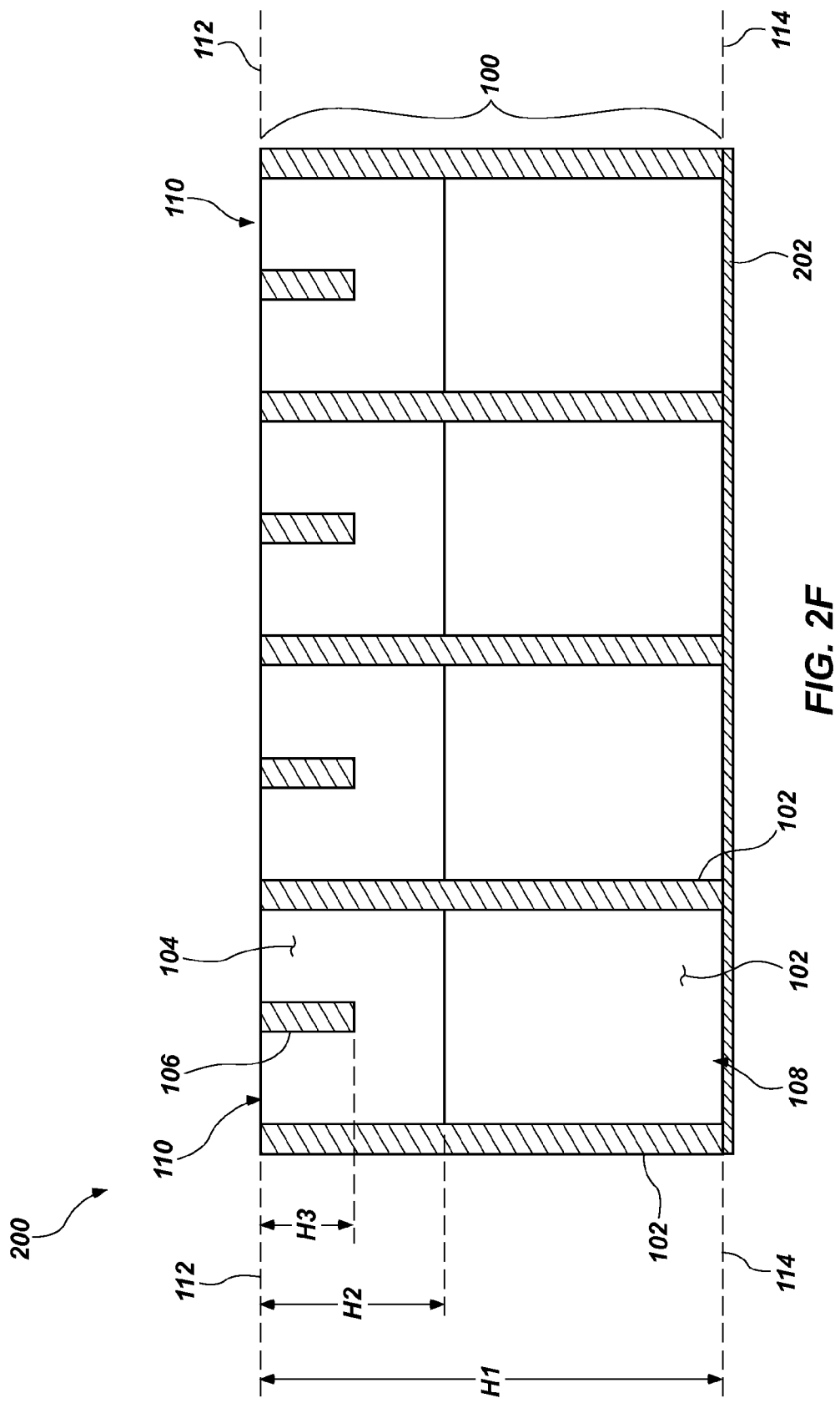
FIG. 2F is a cross-sectional side view of the cushioning element of FIGS. 2A-2E viewed in the plane of section line D-D in FIG. 2C.

FIG. 2A shows a top perspective view of a cushioning element 200 that includes the cushioning element 100 shown in FIGS. 1A through 1F with a stabilizing material 202 secured to the bottom of some or all of the buckling walls 102. FIG. 2B shows a bottom perspective view of the cushioning element 200. FIG. 2C shows a top plan view of the cushioning element 200. FIG. 2D shows a bottom plan view of the cushioning element 200. FIG. 2E shows a section view of the cushioning element 200 from the section line C-C shown in FIG. 2C. FIG. 2F shows a section view of the cushioning element 200 from the section line D-D shown in FIG. 2C. The stabilizing material 202 may be configured to pinion a portion of the buckling walls 102 such that the buckling walls 102 better maintain their shape under a load. The stabilizing material 202 and the buckling walls 102 may be orthogonal (i.e., perpendicular at the point of intersection).

The portion of the buckling walls 102 adjacent the stabilizing material 202 may tend to remain in position upon application of a load to the opposite side of the cushioning element 200. The support provided by the stabilizing material 202 may contribute to the overall stability of the cushioning element 200 when an irregularly shaped object presses on the side of the cushioning element 200 opposite the stabilizing material 202. That is, a cushioning element 200 may withstand a larger and/or more uneven force without collapsing than a cushioning element 100 without the stabilizing material 202. The dimensions of the voids 108 may vary about 20% or less, about 10% or less, about 5% or less, or even about 2% or less when a load is applied to the top cushioning surface of the cushioning element 200. For example, if the voids 108 measure 2 inches by 2 inches, (i.e., the buckling walls 102 are arranged in a nominally 2-inch by 2-inch square grid), the dimensions of the voids 108 under a load, measured at the stabilizing material 202, may be between about 1.6 inches by 1.6 inches and about 2.4 inches by 2.4 inches. The amount of variation in the dimensions of the voids may depend on the composition of the stabilizing material 202, the method of attachment to the buckling walls 102, and the presence of any other cushioning materials.

The stabilizing material 202 may be selected to support the buckling walls 102 near the point of intersection and to help the buckling walls 102 maintain their positions under a load. The stabilizing material 202 may be an elastomeric material, such as the elastomeric materials described above. The stabilizing material 202 may have the same composition as the buckling walls 102 or a different composition. In embodiments in which the stabilizing material 202 and the buckling walls 102 are of the same composition, the stabilizing material 202 may be integrally formed with the buckling walls 102 or may be subsequently attached. For example, stabilizing materials 202 may be formed of elastomeric materials including elastomeric polymers, plasticizers, fillers, antioxidants, resins, pigments, etc. In some embodiments, the stabilizing material 202 may include a gelatinous elastomer, a thermoplastic elastomer, rubber, a synthetic elastomer, or a combination thereof. In some embodiments, the stabilizing material 202 may be a fabric, such as a non-stretchable fabric, a limited-stretch fabric, or a stretchable fabric. As used herein, the term "non-stretchable fabric" means and includes a fabric that stretches elastically (exhibits elastic strain) less than about 2% (before breaking or plastically deforming) along a linear dimension, when tested according to standard stress-strain test methods, such as ASTM Standard D4964-96(2008)e2, "Standard Test Method for Tension and Elongation of Elastic Fabrics (Constant-Rate-of Extension Type Tensile Testing Machine)" (ASTM Int'l, West Conshohocken, Pa., 2008). As used herein, the term "limited-stretch fabric" means and includes a fabric that stretches from about 2% to about 12% (before breaking or plastically deforming) along a linear dimension, when tested according to standard stress-strain test methods. As used herein, the term "stretchable fabric" means and includes a fabric that elastically stretches more than about 12% (before breaking or plastically deforming) along a linear dimension, when tested according to standard stress-strain test methods.

The stabilizing material 202 may be secured to the buckling walls 102 by any appropriate means, such as by an adhesive, heat-fusing, etc. In embodiments in which the stabilizing material 202 is a fabric or foam material, the stabilizing material 202 may define a plurality of voids (e.g., among fibers of the fabric or cell walls of the foam material). A portion of the material of the buckling walls 102 may be disposed within the voids, securing the buckling walls 102 to the stabilizing material 202.

The cushioning element 200 may be used to support a cushioned object. For example, an object with a non-planar surface (e.g., a curved surface of a person's body) may rest against the buckling walls 102, 104, 106 of the cushioning element 200. The stabilizing material 202 on the opposite side of the cushioning element 200 may rest against a flat support (e.g., a bed structure, a box spring, or a chair seat). That is, the stabilizing material 202 may define the bottom or base of the cushioning element 200 and a cushioned object may be placed in contact with the buckling walls 102, 104, 106. This contact may be direct or indirect (e.g., via covering materials or other materials, including other cushioning materials).

Application of a force on the buckling walls 102, 104, 106 (e.g., weight of the cushioned object) causes a compression force on the buckling walls 102, 104, 106. Some of the force is transferred from the buckling walls 102, 104, 106 to one or more other buckling walls 102, 104, 106. When the applied force to a particular buckling wall 102, 104, 106 exceeds a certain threshold value, that buckling wall 102, 104, 106 buckles, reducing the amount of force carried by that particular buckling wall 102, 104, 106, in comparison to the load it would have carried had it been constrained against buckling (e.g., resulting in a reduced slope of an associated stress-strain curve or load-deflection curve after buckling). The force on nearby buckling walls 102, 104, 106 may increase or change direction due to lateral transfer of the load through the buckling walls 102, 104, 106. The stabilizing material 202 may prevent buckling walls 102, 104, 106 from deforming so far from their unloaded positions that the cushioning element 200 collapses entirely or "bottoms out" in a portion of the cushioning element.

As described in U.S. Pat. No. 7,730,566, previously incorporated by reference, the buckling walls 102 may buckle first in the portion of the cushioning element 200 in which the buckling walls 104, 106 are not present. Increasing the load may cause upper portions (in the orientation shown in FIG. 2A) of the buckling walls 102 to buckle—the portions adjacent the buckling walls 104, 106. Some of the load may be transferred to the buckling walls 104, 106. As the load increases, the buckling walls 104, 106 may buckle.

The buckling walls 104, 106 may buckle in a similar manner as the buckling walls 102 or may buckle laterally. The buckling walls 104, 106 provide additional support for the load, which may be beneficial especially in areas in which one or more buckling walls 102 have buckled. The buckling walls 102, 104, 106 may each buckle at different threshold loads. For example, the buckling walls 102 may buckle first (i.e., under a smaller load), followed by the buckling walls 104 (i.e., under a larger load), then by the buckling walls 106 (i.e., under a still larger load). Alternatively, the buckling walls 106 or the buckling walls 104 may buckle first. The buckling walls 102, 104, 106 may buckle in any order. For example, if the buckling walls 102 are thinner in the portion adjacent to buckling walls 104 or 106 than the portion below the buckling walls 104, the buckling walls 104 or 106 may buckle first.

The buckling of the buckling walls 102, 104, 106 may relieve pressure in the location of the buckling by decreasing the amount of the load carried by the buckled buckling walls 102, 104, 106 in comparison to the load they would have carried had they been constrained against buckling. Thus, a load may be transferred to other portions of the cushioning element 200. Transfer of all or a portion of the load to other portions of the cushioning element 200 may reduce peak pressure, which may increase comfort for humans or animals, and may protect cushioned objects from damage. Attachment of the buckling walls 102 to the stabilizing material 202 may tend to transfer the load laterally through the cushioning element 200, and may therefore prevent the collapse (and accompanying decrease in support) of an entire section of the cushioning element 200. That is, when one or more buckling walls 102, 104, 106 buckle, adjacent buckling walls 102, 104, 106 may carry additional load to compensate. Thus, "bottoming out" of the cushioning element 200 may be avoided. Such a load transfer may be particularly beneficial when an irregularly shaped object is placed against the closer-spaced buckling walls 102, 104, 106 (i.e., against the top of the cushioning element 200, as oriented in FIG. 2A), and the stabilizing material 202 is placed against a relatively flat surface (e.g., a box spring). When the cushioning element 200 is used in such an orientation, buckling may be limited to the area of protruding irregularities of the cushioned object, and support for the object may be more uniform than support provided by conventional cushioning materials.

Figure 3A:
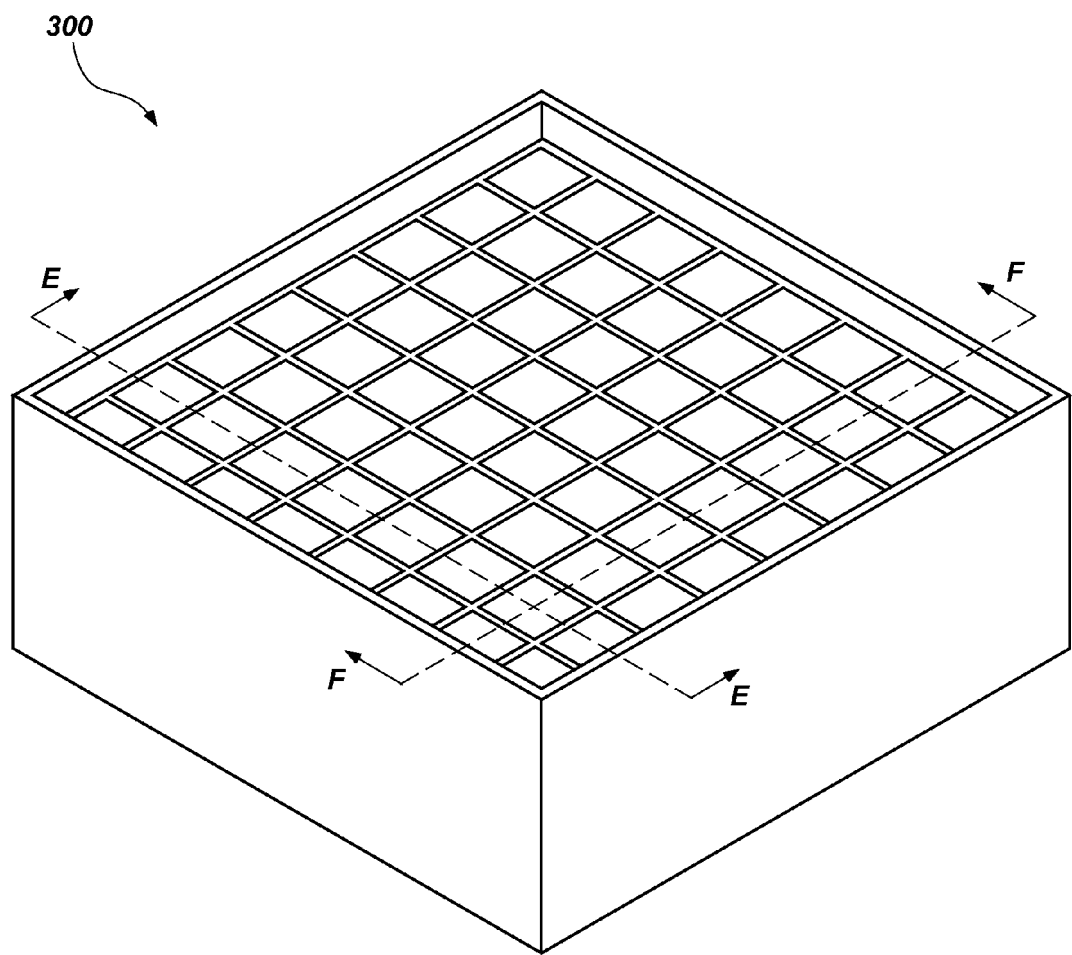
FIG. 3A is a perspective view of a mold for forming an elastomeric cushion member having buckling walls like that shown in FIGS. 1A-1F.
Figure 3B:
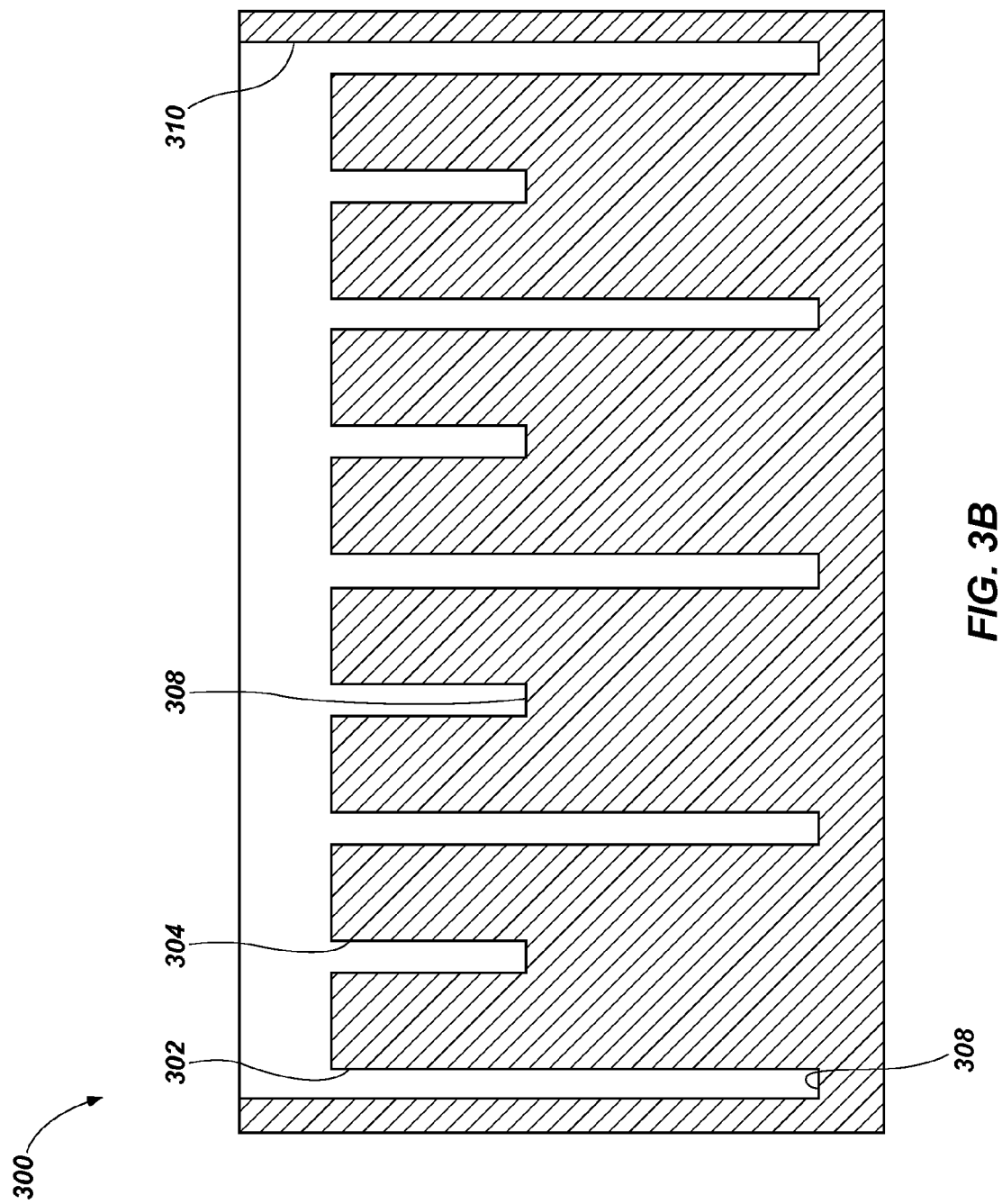
FIG. 3B is a cross-sectional view of the mold of FIG. 3A viewed in a plane of section line E-E in FIG. 3A.
Figure 3C:
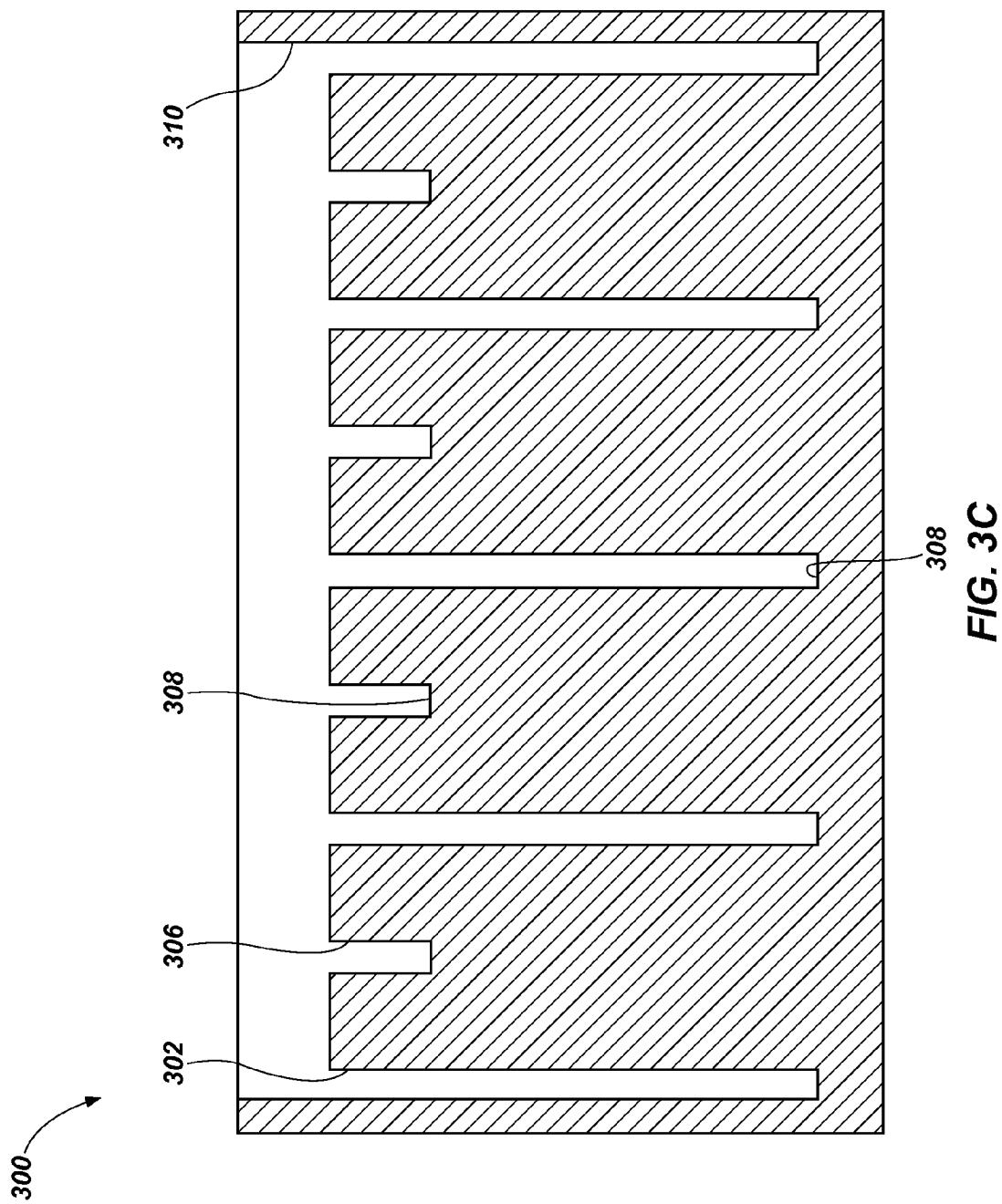
FIG. 3C is a cross-sectional view of the mold of FIGS. 3A and 3B viewed in a plane of section line F-F in FIG. 3A.

Cushioning elements 200 may be formed in a mold 300, shown in FIG. 3A. FIG. 3B shows a section view of the mold 300 from a plane through section line E-E shown in FIG. 3A, and FIG. 3C shows a section view of the mold 300 from a plane through section line F-F shown in FIG. 3A. The mold 300 includes walls and surfaces configured to define the buckling walls 102, 104, 106 of the cushioning element 200 shown in FIGS. 2A through 2F. For example, the mold 300 may include inner walls 302, 304, 306, bottom surfaces 308, and outer walls 310 that define troughs or trenches. The interior of the mold 300 may have an interior shape that generally corresponds to the exterior shape of the cushioning element 200 to be formed therein. For example, the shape of the inner walls 302, bottom surfaces 308, and outer walls 310 may correspond to the shape of the buckling walls 102. The shape of the inner walls 304 and bottom surfaces 308 may correspond to the shape of the buckling walls 104. The shape of the inner walls 306 and bottom surfaces 308 may correspond to the shape of the buckling walls 106.

The buckling walls 102, 104, 106 may be formed by disposing an elastomeric precursor within the mold and curing the elastomeric precursor. The elastomeric precursor may include the components of an elastomeric material, as described above. The elastomeric precursor may be formulated to react upon exposure to heat, pressure, humidity, etc. In some embodiments, the elastomeric precursor may include a curative, such that the elastomeric precursor will cure without exposure to heat, pressure, humidity, etc. The elastomeric precursor may react to form cross-linking bonds between polymeric chains. Before curing, the elastomeric precursor may be pourable, such that the mold 300 may be easily filled with elastomeric precursor. Curing the elastomeric precursor may form the buckling walls 102, 104, 106. If the cushioning element 200 is formed in the mold 300, the buckling walls 102, 104, 106 are secured to one another as the elastomeric precursor cures.

In some embodiments, the buckling walls 102, 104, 106 may be separately formed, such as in individual molds, extrusion dies, etc. The buckling walls 102, 104, 106 may be assembled and secured to one another, such as by an adhesive, heat-fusing, etc. For example, a portion of the material of the buckling walls 102, 104, 106 may be heated to its melting point, and the buckling walls 102, 104, 106 may be pressed together and cooled.

The stabilizing material 202 (FIGS. 2A through 2F) may be secured to the buckling walls 102 after formation of the buckling walls 102, 104, 106. The buckling walls 102, 104, 106 may together form the cushioning element 100, as shown in FIGS. 1A through 1F, before attachment of the stabilizing material 202. If the buckling walls 102, 104, 106 are formed in a mold 300, the buckling walls 102, 104, 106 may be removed from the mold 300 before securing the stabilizing material 202 to the buckling walls 102. The stabilizing material 202 may be secured to buckling walls 102 by an adhesive, heat-fusing, etc. For example, a portion of the material of the buckling walls 102 may be heated to its melting point, and the stabilizing material 202 may be pressed against the buckling walls 102 while the material of the buckling walls 102 cools. In embodiments in which the stabilizing material 202 is an elastomeric material, a portion of the stabilizing material 202 may be heated in addition to or instead of the buckling walls 102. In embodiments in which the stabilizing material 202 is a fabric or foam material, a heated portion of the buckling walls 102 may infuse into voids of the stabilizing material 202 before the material of the buckling walls 102 cools. The cooled material of the buckling walls 102 may secure the stabilizing material 202 to the buckling walls 102 without a separate adhesive material. For example, the cushioning element 100 (FIGS. 1A through 1F) may be placed upside down on a table (i.e., with larger voids 108 facing upward and the smaller voids 110 against the table). The stabilizing material 202 (FIGS. 2A through 2F) (i.e., a piece of fabric) may be disposed above the cushioning element 100. A heated plate (not shown) may be pressed onto the stabilizing material 202 with a force to compress the cushioning element 100 to about 97% of its original height. The stabilizing material 202 may heated by the plate to a temperature below its melting temperature. The elastomeric material of the buckling walls 102 adjacent the stabilizing material 202 is also heated by the plate through the fabric. Some of the elastomeric material may melt and flow into interstices of the stabilizing material 202 (e.g., between fibers of the fabric). The heated plate may be removed and the elastomeric material may be allowed to cool and solidify. Upon cooling, the stabilizing material 202 becomes integral with the bottom end of the cushioning element 100, forming the cushioning element 200 (FIGS. 2A through 2F). The stabilizing material 202 stabilizes the cushioning element 200 when a cushioned object contacts the other side of the cushioning element 200.

In some embodiments, an adhesive material may be applied to the buckling walls 102, the stabilizing material 202, or both, to promote the adhesion of the stabilizing material 202 to the buckling walls 102. The adhesive material may be, for example, a solvent-based adhesive, a polymer-dispersion adhesive, a pressure-sensitive adhesive, a contact adhesive, a hot-melt adhesive, a multi-component adhesive (e.g., an epoxy), etc. The adhesive material may be applied after the buckling walls 102 are formed. The adhesive material, if used, may be cured before the cushioning element 200 is used. In certain embodiments, the stabilizing material 202 may be sewn to the buckling walls 102.

One or more covers or other cushioning materials (e.g., foam, pocketed coil springs, felt, etc.) may be secured to the cushioning element 200 described herein. For example, covers may be secured over or around the cushioning element 200. Covers or other cushioning materials may be secured by sewing, quilting, applying an adhesive, heat welding, or by any other method known in the art, or may remain unsecured (e.g., a zippered cover). Covers or other cushioning materials may provide additional stabilization of the buckling walls 102, 104, 106.

Cushioning elements 200 described herein may have various benefits. For example, cushioning elements 200 may be more comfortable, more pressure-relieving, or more shear-stress-relieving than conventional cushioning elements because the stabilizing material 202 supports the overall shape of the cushioning element 200 under an irregular load. A cushioned object may experience lower peak pressure from the cushioning element 200 than from conventional cushioning elements, yet the cushioning element 200 may maintain its shape better than conventional cushioning elements. The different sizes of the voids 108, 110 allow the buckling walls 102, 104, 106 to buckle at different loads. Thus, the cushioning element 200 may experience localized buckling at protruding irregularities of a cushioned object.

EXAMPLES

An elastomeric gel is prepared by mixing one part by weight of a styrene-ethylene-ethylene-propylene-styrene (SEEPS) elastomeric triblock copolymer (e.g., SEPTON® 4055, available from Kuraray America, Inc.) with two parts by weight of a 70-weight straight-cut white paraffinic mineral oil (e.g., CARNATION® white mineral oil, available from Sonneborn, Inc.) and traces of pigment and antioxidant (e.g., IRGANOX® 1010 and/or IRGAFOS® 168, from BASF Corp.). Microspheres may be added to improve processability, to reduce weight, or to increase gel stiffness.

Molten elastomeric gel is injected into a mold (e.g., a mold 300, as shown in FIG. 3A) by the processes described in U.S. Pat. No. 7,666,341, issued Feb. 23, 2010, and entitled "Screed Mold Method," which is incorporated herein in its entirety by this reference. The top of the mold may correspond to the top of the cushioning element to be formed (e.g., the top of cushioning element 100 in the orientation shown in FIG. 1A). Buckling walls (e.g., buckling walls 102, 104, 106) are formed by the injection of the molten elastomeric gel into the mold.

The elastomeric gel is solidified by cooling and removed from the mold to form a queen-sized mattress core, 6 inches (15.24 cm) tall by 80 inches (203.2 cm) long by 60 inches (152.4 cm) wide. Hollow gel columns having a square 2.0-inch (5.08-cm) void (measured from the center of one buckling wall to the center of an adjacent buckling wall) run the entire 6-inch height of the mattress, and may be visible from the bottom of the mattress core. Gel cross-members (e.g., buckling walls 104) are integral in the top 2.0 inches (5.08 cm) of the 6-inch mattress height and convert the 2.0-inch square voids into two 1.0-inch (2.54 cm) by 2.0-inch (5.08 cm) rectangular voids. Another set of gel cross-members (e.g., buckling walls 106) is integral in the top 1.0 inch (2.53 cm) of the 6-inch mattress height and converts the two 1.0-inch by 2.0-inch rectangular voids into four 1.0-inch (2.54-cm) square voids, which may be visible from the top of the mattress core. Thus, each square 2.0-inch void at the bottom of the mattress core corresponds to four 1.0-inch square voids at the top of the mattress core.

A point-bonded nylon non-woven fabric is selected having a density of 4 oz/yd$^2$ (136 g/m$^2$). The fabric is largely non-stretchable and relatively stiff, both of which aid stabilization. Alternatively, a nylon woven fabric, a nylon non-woven fabric other than point-bonded non-woven fabric, or a polyester woven or non-woven fabric may be used. Polyester has a higher melt temperature than nylon (polyamide), which may be important for some applications. The fabric is heat-pressed into the bottom of the mattress core at a temperature and pressure that will cause the bottom surfaces of the 2.0-inch squares to melt and flow into interstices of the fabric. The heat and pressure are then removed and the gel is cooled. The queen-sized mattress core is then ready to be placed into a zippered cover.

Additional non-limiting example embodiments of the disclosure are described below.

Embodiment 1: A cushioning element having a top cushioning surface and a bottom base surface, the cushioning element comprising an elastomeric cushion member and a stabilizing material. The elastomeric cushion member includes a first plurality of interconnected buckling walls having a first mean height and comprising an elastomeric material and a second plurality of buckling walls having a second mean height less than the first mean height, the second plurality of buckling walls comprising the elastomeric material. Each interconnected buckling wall of the first plurality has a first end in a first plane and a second end in a second plane, the first mean height measured from the first end of the interconnected buckling walls to the second end of the interconnected buckling walls. Each buckling wall of the second plurality has a first end in the first plane and a second end between the first plane and the second plane, the second mean height measured from the first end of the buckling walls to the second end of the buckling walls. Each buckling wall of the second plurality intersects and connects to at least two buckling walls of the first plurality. The elastomeric material comprises an elastomeric polymer. The stabilizing material is secured to the second ends of the first plurality of interconnected buckling walls. A surface of the stabilizing material on a side thereof opposite the elastomeric cushion member defines the bottom base surface of the cushioning element. The first ends of the first plurality of interconnected buckling walls and the first ends of the second plurality of buckling walls define the top cushioning surface of the cushioning element.

Embodiment 2: The cushioning element of Embodiment 1, wherein each buckling wall of the second plurality is configured to move independently of the stabilizing material.

Embodiment 3: The cushioning element of Embodiment 1, further comprising a third plurality of buckling walls having a third mean height and comprising the elastomeric material.

Each buckling wall of the third plurality intersects and connects to at least one buckling wall of the first plurality and at least one buckling wall of the second plurality. Each buckling wall of the third plurality has a first end in the first plane and a second end between the first plane and the second plane, the third mean height measured from the first end of the buckling walls to the second end of the buckling walls, wherein the second mean height is greater than the third mean height.

Embodiment 4: The cushioning element of Embodiment 3, wherein each buckling wall of the third plurality is configured to move independently of the stabilizing material.

Embodiment 5: The cushioning element of any of Embodiments 1 through 4, wherein the stabilizing material is heat-fused to the second ends of the first plurality of interconnected buckling walls.

Embodiment 6: The cushioning element of any of Embodiments 1 through 5, wherein the stabilizing material is permeable, and wherein a portion of the elastomeric material of the first plurality of interconnected buckling walls is disposed within the stabilizing material.

Embodiment 7: The cushioning element of Embodiment 6, wherein the stabilizing material comprises a fabric.

Embodiment 8: The cushioning element of Embodiment 7, wherein the stabilizing material comprises a nylon or polyester fabric.

Embodiment 9: The cushioning element of any of Embodiments 1 through 8, wherein the stabilizing material is secured to the second ends of the first plurality of interconnected buckling walls by an adhesive.

Embodiment 10: The cushioning element of any of Embodiments 1 through 9, wherein the stabilizing material comprises a non-stretchable fabric.

Embodiment 11: The cushioning element of any of Embodiments 1 through 10, wherein the stabilizing material comprises a limited-stretch fabric.

Embodiment 12: The cushioning element of any of Embodiments 1 through 11, wherein the elastomeric material further comprises a plurality of microspheres.

Embodiment 13: The cushioning element of Embodiment 12, wherein the plurality of microspheres comprises a plurality of hollow microspheres.

Embodiment 14: The cushioning element of any of Embodiments 1 through 13, wherein the elastomeric polymer comprises an A-B-A triblock copolymer.

Embodiment 15: The cushioning element of any of Embodiments 1 through 14, wherein the elastomeric material further comprises a polymer, and wherein a ratio of a weight of the plasticizer to a weight of the elastomeric polymer is from about 0.1 to about 50.

Embodiment 16: The cushioning element of any of Embodiments 1 through 15, wherein the stabilizing material has a material composition differing from a material composition of the first plurality of interconnected buckling walls.

Embodiment 17: A method of forming a cushioning element having a top cushioning surface and a bottom base surface, the method comprising providing an elastomeric cushion member. The elastomeric cushion member includes a first plurality of interconnected buckling walls having a first mean height and comprising an elastomeric material, and a second plurality of buckling walls having a second mean height less than the first mean height, the second plurality of buckling walls comprising the elastomeric material, wherein the first ends of the first plurality of interconnected buckling walls and the first ends of the second plurality of buckling walls define the top cushioning surface of the cushioning element. The method further comprises securing a stabilizing material to the second ends of the first plurality of interconnected buckling walls. Each interconnected buckling wall of the first plurality has a first end in a first plane and a second end in a second plane, the first mean height measured from the first end of the interconnected buckling walls to the second end of the interconnected buckling walls. Each buckling wall of the second plurality intersects and connects to at least two buckling walls of the first plurality. Each buckling wall of the second plurality has a first end in the first plane and a second end between the first plane and the second plane, the second mean height measured from the first end of the buckling walls to the second end of the buckling walls. The elastomeric material comprises an elastomeric polymer. A surface of the stabilizing material on a side thereof opposite the elastomeric cushion member defines the bottom base surface of the cushioning element.

Embodiment 18: The method of Embodiment 17, wherein the provided elastomeric cushion member further comprises a third plurality of buckling walls having a third mean height and comprising the elastomeric material. Each buckling wall of the third plurality intersects and connects to at least one buckling wall of the first plurality and at least one buckling wall of the second plurality. Each buckling wall of the third plurality has a first end in the first plane and a second end between the first plane and the second plane, the third mean height measured from the first end of the buckling walls to the second end of the buckling walls, wherein the second mean height is greater than the third mean height.

Embodiment 19: The method of Embodiment 17 or Embodiment 18, wherein providing the elastomeric cushion member comprises forming the elastomeric cushion member.

Embodiment 20: The method of Embodiment 19, wherein forming the elastomeric cushion member comprises solidifying at least a portion of an elastomeric precursor.

Embodiment 21: The method of Embodiment 19 or Embodiment 20, wherein forming the elastomeric cushion member further comprises forming the first plurality of interconnected buckling walls to comprise an A-B-A triblock copolymer.

Embodiment 22: The method of any of Embodiments 19 through 21, wherein forming the elastomeric cushion member further comprises disposing an elastomeric precursor comprising an elastomeric polymer and a plasticizer within a mold, solidifying the elastomeric precursor to form the elastomeric cushion member, and removing the elastomeric cushion member from the mold. A ratio of a weight of the plasticizer to a weight of the elastomeric polymer is from about 0.1 to about 50. The mold defines a first plurality of interconnected voids having a first mean depth, and a second plurality of voids having a second mean depth less than the first mean depth, each void of the second plurality connected to at least two voids of the first plurality.

Embodiment 23: The method of any of Embodiments 19 through 22, wherein securing the stabilizing material to the second ends of the first plurality of interconnected buckling walls comprises integrally forming a portion of the elastomeric material of the elastomeric cushion member into voids within the stabilizing material.

Embodiment 24: The method of any of Embodiments 17 through 23, wherein securing the stabilizing material to the second ends of the first plurality of interconnected buckling walls comprises securing the stabilizing material to a surface of each of the first plurality of interconnected buckling walls without directly contacting the stabilizing material with the second plurality of buckling walls.

Embodiment 25: The method of any of Embodiments 17 through 24, wherein securing the stabilizing material to the second ends of the first plurality of interconnected buckling walls comprises securing a stabilizing material having a material composition different from a material composition of the first plurality of interconnected buckling walls to a surface of each of the first plurality of interconnected buckling walls.

Embodiments of the disclosure are susceptible to various modifications and alternative forms. Specific embodiments have been shown in the drawings and described in detail herein to provide illustrative examples of embodiments of the disclosure. However, the disclosure is not limited to the particular forms disclosed herein. Rather, embodiments of the disclosure may include all modifications, equivalents, and alternatives falling within the scope of the disclosure as broadly defined herein. Furthermore, elements and features described herein in relation to some embodiments may be implemented in other embodiments of the disclosure, and may be combined with elements and features described herein in relation to other embodiments to provide yet further embodiments of the disclosure.

What is claimed is:

1. A cushioning element having a top cushioning surface and a bottom base surface, the cushioning element comprising:
    an elastomeric cushion member including:
        a first plurality of interconnected buckling walls having a first mean height and comprising an elastomeric material, the elastomeric material comprising an elastomeric polymer, each interconnected buckling wall of the first plurality having a first end in a first plane and a second end in a second plane, the first mean height measured from the first end of the interconnected buckling walls to the second end of the interconnected buckling walls; and
        a second plurality of buckling walls having a second mean height less than the first mean height, the second plurality of buckling walls comprising the elastomeric material, each buckling wall of the second plurality intersecting and connected to at least two buckling walls of the first plurality, each buckling wall of the second plurality having a first end and a second end, wherein at least one of the first end and the second end is disposed between the first plane and the second plane, the second mean height measured from the first end of the buckling walls to the second end of the buckling walls;
        wherein the first ends of the first plurality of interconnected buckling walls define the top cushioning surface of the cushioning element; and
    a stabilizing material secured to the second ends of the first plurality of interconnected buckling walls and separated from the second plurality of buckling walls, each buckling wall of the second plurality configured to move independently of the stabilizing material, a surface of the stabilizing material on a side thereof opposite the elastomeric cushion member defining the bottom base surface of the cushioning element.

2. The cushioning element of claim 1, further comprising a third plurality of buckling walls having a third mean height and comprising the elastomeric material, each buckling wall of the third plurality intersecting and connected to at least one buckling wall of the first plurality and at least one buckling wall of the second plurality, each buckling wall of the third plurality having a first end and a second end, wherein at least one of the first end and the second end is disposed between the first plane and the second plane, the third mean height measured from the first end of the buckling walls to the second end of the buckling walls, wherein the second mean height is greater than the third mean height.

3. The cushioning element of claim 2, wherein each buckling wall of the third plurality is configured to move independently of the stabilizing material.

4. The cushioning element of claim 1, wherein the stabilizing material is heat-fused to the second ends of the first plurality of interconnected buckling walls.

5. The cushioning element of claim 1, wherein the stabilizing material is permeable, and wherein a portion of the elastomeric material of the first plurality of interconnected buckling walls is disposed within the stabilizing material.

6. The cushioning element of claim 5, wherein the stabilizing material comprises a fabric.

7. The cushioning element of claim 6, wherein the stabilizing material comprises a nylon or polyester fabric.

8. The cushioning element of claim 1, wherein the stabilizing material is secured to the second ends of the first plurality of interconnected buckling walls by an adhesive.

9. The cushioning element of claim 1, wherein the stabilizing material comprises a non-stretchable fabric.

10. The cushioning element of claim 1, wherein the stabilizing material comprises a limited-stretch fabric.

11. The cushioning element of claim 1, wherein the elastomeric material further comprises a plurality of microspheres.

12. The cushioning element of claim 11, wherein the plurality of microspheres comprises a plurality of hollow microspheres.

13. The cushioning element of claim 1, wherein the elastomeric polymer comprises an A-B-A triblock copolymer.

14. The cushioning element of claim 1, wherein the elastomeric material further comprises a plasticizer, and wherein a ratio of a weight of the plasticizer to a weight of the elastomeric polymer is from about 0.1 to about 50.

15. The cushioning element of claim 1, wherein the stabilizing material has a material composition differing from a material composition of the first plurality of interconnected buckling walls.

16. A method of forming a cushioning element having a top cushioning surface and a bottom base surface, the method comprising:
    providing an elastomeric cushion member including:
        a first plurality of interconnected buckling walls having a first mean height and comprising an elastomeric material, the elastomeric material comprising an elastomeric polymer, each interconnected buckling wall of the first plurality having a first end in a first plane and a second end in a second plane, the first mean height measured from the first end of the interconnected buckling walls to the second end of the interconnected buckling walls; and
        a second plurality of buckling walls having a second mean height less than the first mean height, the second plurality of buckling walls comprising the elastomeric material, each buckling wall of the second plurality intersecting and connected to at least two buckling walls of the first plurality, each buckling wall of the second plurality having a first end and a second end, wherein at least one of the first end and the second end is disposed between the first plane and the second plane, the second mean height measured from the first end of the buckling walls to the second end of the buckling walls;
        wherein the first ends of the first plurality of interconnected buckling walls define the top cushioning surface of the cushioning element; and securing a stabilizing material to the second ends of the first plurality of interconnected buckling walls such that each buckling wall of the second plurality is configured to move independently of the stabilizing material, wherein the stabilizing material is separated from the second plurality of buckling walls, a surface of the stabilizing material on a side thereof opposite the elastomeric cushion member defining the bottom base surface of the cushioning element.

17. The method of claim 16, wherein the provided elastomeric cushion member further comprises a third plurality of buckling walls having a third mean height and comprising the elastomeric material, each buckling wall of the third plurality intersecting and connected to at least one buckling wall of the first plurality and at least one buckling wall of the second plurality, each buckling wall of the third plurality having a first end and a second end, wherein at least one of the first end and the second end is disposed between the first plane and the second plane, the third mean height measured from the first end of the buckling walls to the second end of the buckling walls, wherein the second mean height is greater than the third mean height.

18. The method of claim 16, wherein providing the elastomeric cushion member comprises forming the elastomeric cushion member.

19. The method of claim 18, wherein forming the elastomeric cushion member comprises solidifying at least a portion of an elastomeric precursor.

20. The method of claim 18, wherein forming the elastomeric cushion member further comprises forming the first plurality of interconnected buckling walls to comprise an A-B-A triblock copolymer.

21. The method of claim 18, wherein forming the elastomeric cushion member further comprises:
disposing an elastomeric precursor comprising an elastomeric polymer and a plasticizer within a mold, a ratio of a weight of the plasticizer to a weight of the elastomeric polymer being from about 0.1 to about 50, the mold defining:
a first plurality of interconnected voids having a first mean depth; and
a second plurality of voids having a second mean depth less than the first mean depth, each void of the second plurality connected to at least two voids of the first plurality;
solidifying the elastomeric precursor to form the elastomeric cushion member; and
removing the elastomeric cushion member from the mold.

22. The method of claim 18, wherein securing the stabilizing material to the second ends of the first plurality of interconnected buckling walls comprises integrally forming a portion of the elastomeric material of the elastomeric cushion member into voids within the stabilizing material.

23. The method of claim 16, wherein securing the stabilizing material to the second ends of the first plurality of interconnected buckling walls comprises securing the stabilizing material to a surface of each of the first plurality of interconnected buckling walls without directly contacting the stabilizing material with the second plurality of buckling walls.

24. The method of claim 16, wherein securing the stabilizing material to the second ends of the first plurality of interconnected buckling walls comprises securing a stabilizing material having a material composition different from a material composition of the first plurality of interconnected buckling walls to a surface of each of the first plurality of interconnected buckling walls.

* * * * *